US010310247B2

(12) United States Patent
Suzuki

(10) Patent No.: US 10,310,247 B2
(45) Date of Patent: Jun. 4, 2019

(54) SAMPLE OBSERVATION DEVICE AND SAMPLE OBSERVATION METHOD

(71) Applicant: OLYMPUS CORPORATION, Hachioji-shi, Tokyo (JP)

(72) Inventor: Yoshimasa Suzuki, Kawasaki (JP)

(73) Assignee: OLYMPUS CORPORATION, Tokyo (JP)

( * ) Notice: Subject to any disclaimer, the term of this patent is extended or adjusted under 35 U.S.C. 154(b) by 84 days.

(21) Appl. No.: 15/460,743

(22) Filed: Mar. 16, 2017

(65) Prior Publication Data

US 2017/0184832 A1 Jun. 29, 2017

Related U.S. Application Data

(63) Continuation of application No. PCT/JP2014/078424, filed on Oct. 20, 2014.

(51) Int. Cl.
*G02B 21/06* (2006.01)
*G02B 21/12* (2006.01)
(Continued)

(52) U.S. Cl.
CPC ............ *G02B 21/12* (2013.01); *G02B 5/005* (2013.01); *G02B 21/02* (2013.01); *G02B 21/06* (2013.01); *G02B 21/125* (2013.01); *G02B 21/14* (2013.01)

(58) Field of Classification Search
CPC .............. G02B 21/0004; G02B 21/004; G02B 21/0016; G02B 21/0044; G02B 21/0088;
(Continued)

(56) References Cited

U.S. PATENT DOCUMENTS

| 4,200,354 A | 4/1980 | Hoffman |
| 7,505,200 B2 | 3/2009 | Krueger |

(Continued)

FOREIGN PATENT DOCUMENTS

| JP | 51029149 A | 3/1976 |
| JP | 09218357 A | 8/1997 |

(Continued)

OTHER PUBLICATIONS

International Preliminary Report on Patentability (IPRP) and Written Opinion (and English translation thereof) dated May 4, 2017, issued in International Application No. PCT/JP2014/078424.
(Continued)

*Primary Examiner* — Mustak Choudhury
(74) *Attorney, Agent, or Firm* — Holtz, Holtz & Volek PC

(57) ABSTRACT

A sample observation device includes an illumination optical system and an observation optical system, and the illumination optical system includes a light source, a condenser lens, and an aperture member, and the observation optical system includes an objective lens and an imaging lens, and the aperture member has a light-shielding part or a darkening part, and a transmission part, and the transmission part is located outside of an outer edge of the light-shielding part or the darkening part, and an image of an inner edge of the transmission part is formed inside of an outer edge of a pupil of the objective lens, and an image of an outer edge of the transmission part is formed outside of the outer edge of the pupil of the objective lens, and the following conditional expression is satisfied.

$0.005 \leq \text{Ratio} \leq 0.9$.

8 Claims, 16 Drawing Sheets

(51) Int. Cl.
*G02B 21/02* (2006.01)
*G02B 5/00* (2006.01)
*G02B 21/14* (2006.01)

(58) Field of Classification Search
CPC ........ G02B 21/02; G02B 21/06; G02B 21/08;
G02B 21/025; G02B 21/082; G02B
21/084; G02B 21/086; G02B 21/088;
G02B 21/10; G02B 21/12; G02B 21/14;
G02B 21/22; G02B 21/24; G02B 21/26;
G02B 21/34; G02B 21/36; G02B 21/125;
G02B 21/244; G02B 21/361; G02B
21/364; G02B 21/365; G02B 21/367;
G02B 21/368; G02B 13/22; G02B 27/58;
G02B 23/24; G02B 23/2407; G02B
23/2461; H04N 5/2254; H04N 5/2256;
H04N 5/2258; H04N 5/238; H04N
5/23293
USPC ....... 359/239, 363, 368, 369, 370, 374, 380,
359/381, 385, 387, 641, 656, 676, 679,
359/683, 686, 687, 718, 740, 779, 834;
356/445, 501, 512, 601, 609; 348/79, 80
See application file for complete search history.

(56) References Cited

U.S. PATENT DOCUMENTS

| | | |
|---|---|---|
| 2002/0191281 A1 | 12/2002 | Osa et al. |
| 2004/0120029 A1* | 6/2004 | Krueger ................ G02B 21/14 359/370 |
| 2012/0099172 A1 | 4/2012 | Ohki |
| 2012/0236137 A1 | 9/2012 | Kawashima |
| 2012/0262562 A1 | 10/2012 | Fukutake et al. |
| 2013/0314776 A1 | 11/2013 | Mizuta et al. |
| 2014/0210983 A1* | 7/2014 | Shimura ............ G02B 21/0016 348/80 |
| 2016/0048011 A1 | 2/2016 | Suzuki et al. |

FOREIGN PATENT DOCUMENTS

| | | |
|---|---|---|
| JP | 2004126590 A | 4/2004 |
| JP | 2012088530 A | 5/2012 |
| JP | 2012194503 A | 10/2012 |
| JP | 2012222672 A | 11/2012 |
| WO | 2014178294 A1 | 11/2014 |

OTHER PUBLICATIONS

International Search Report (ISR) and Written Opinion dated Jan. 27, 2015 issued in International Application No. PCT/JP2014/078424.
Notice of Allowance dated Jul. 20, 2018 issued in U.S. Appl. No. 14/926,517.
Office Action (Non-Final Rejection) dated Feb. 8, 2018 issued in U.S. Appl. No. 14/926,517.
U.S. Appl. No. 14/926,517; Title: "Sample Observation Device and Sample Observation Method"; First Named Inventor: Yoshimasa Suzuki; filed Oct. 29, 2015.
International Search Report dated Jun. 24, 2014, issued in International Application PCT/JP2014/061111.
Written Opinion of the International Search Authority dated Jun. 24, 2014, issued in International Application PCT/JP2014/061111.

* cited by examiner

FIG. 4A
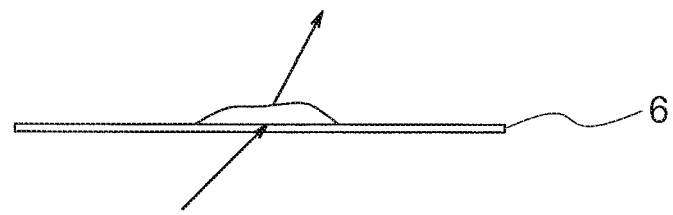
FIG. 4B
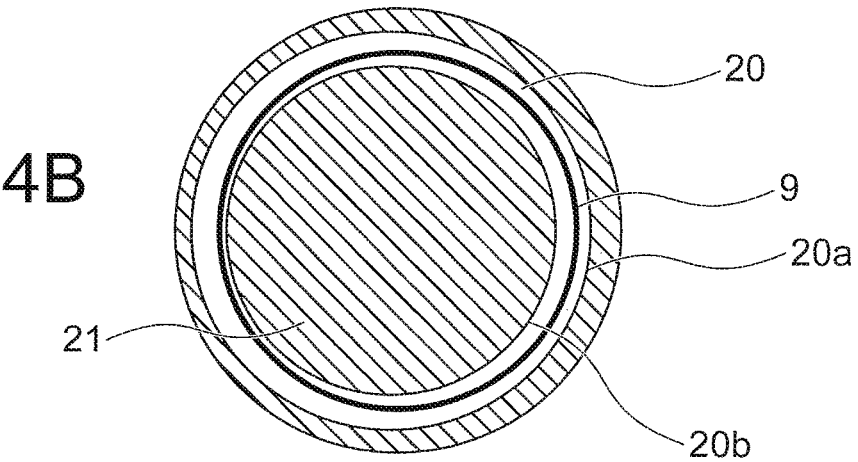
FIG. 4C
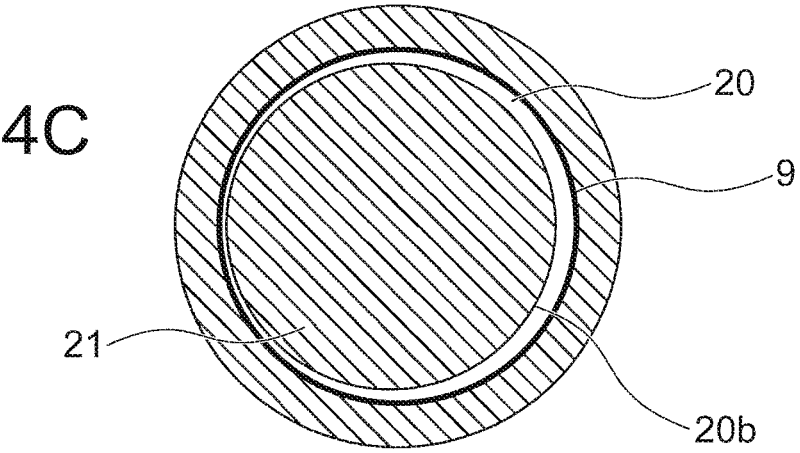

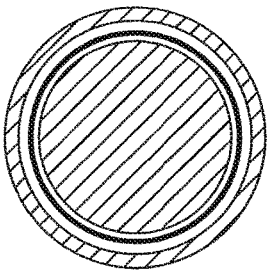
A
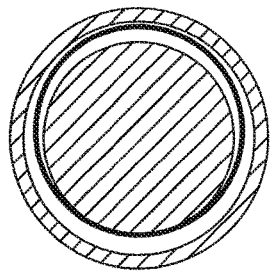
B
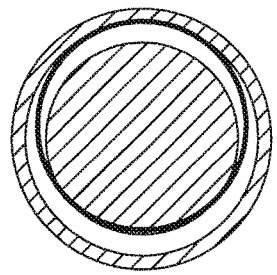
C
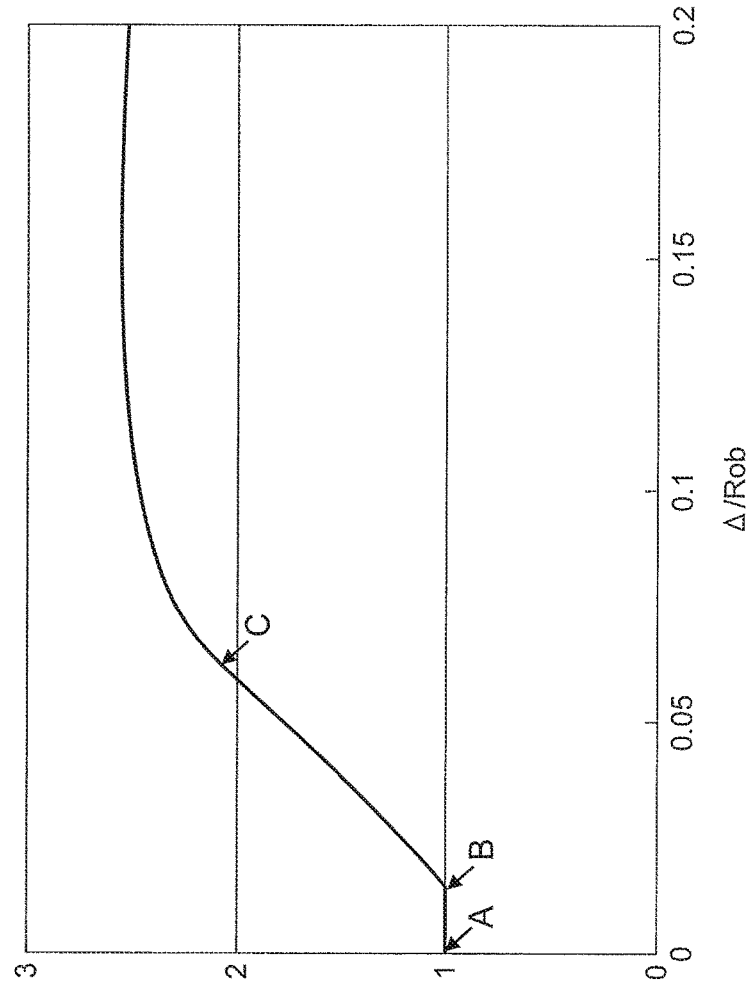
FIG. 7A
FIG. 7B
FIG. 7C
FIG. 7D

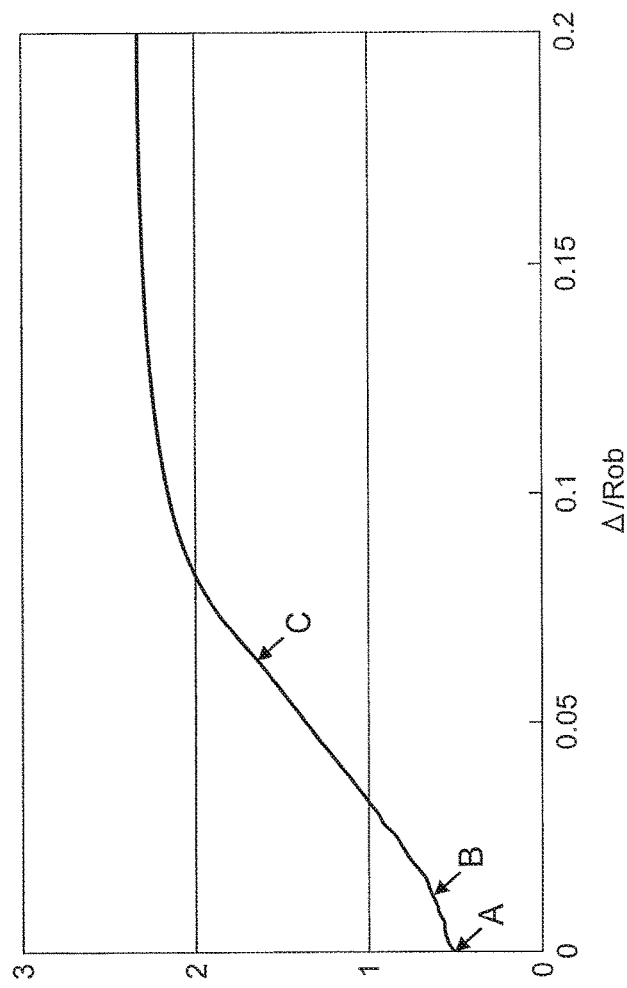
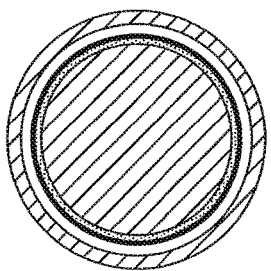
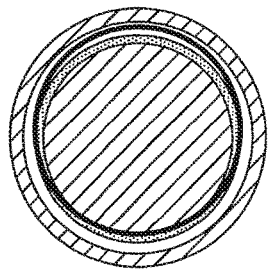
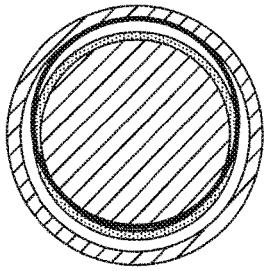

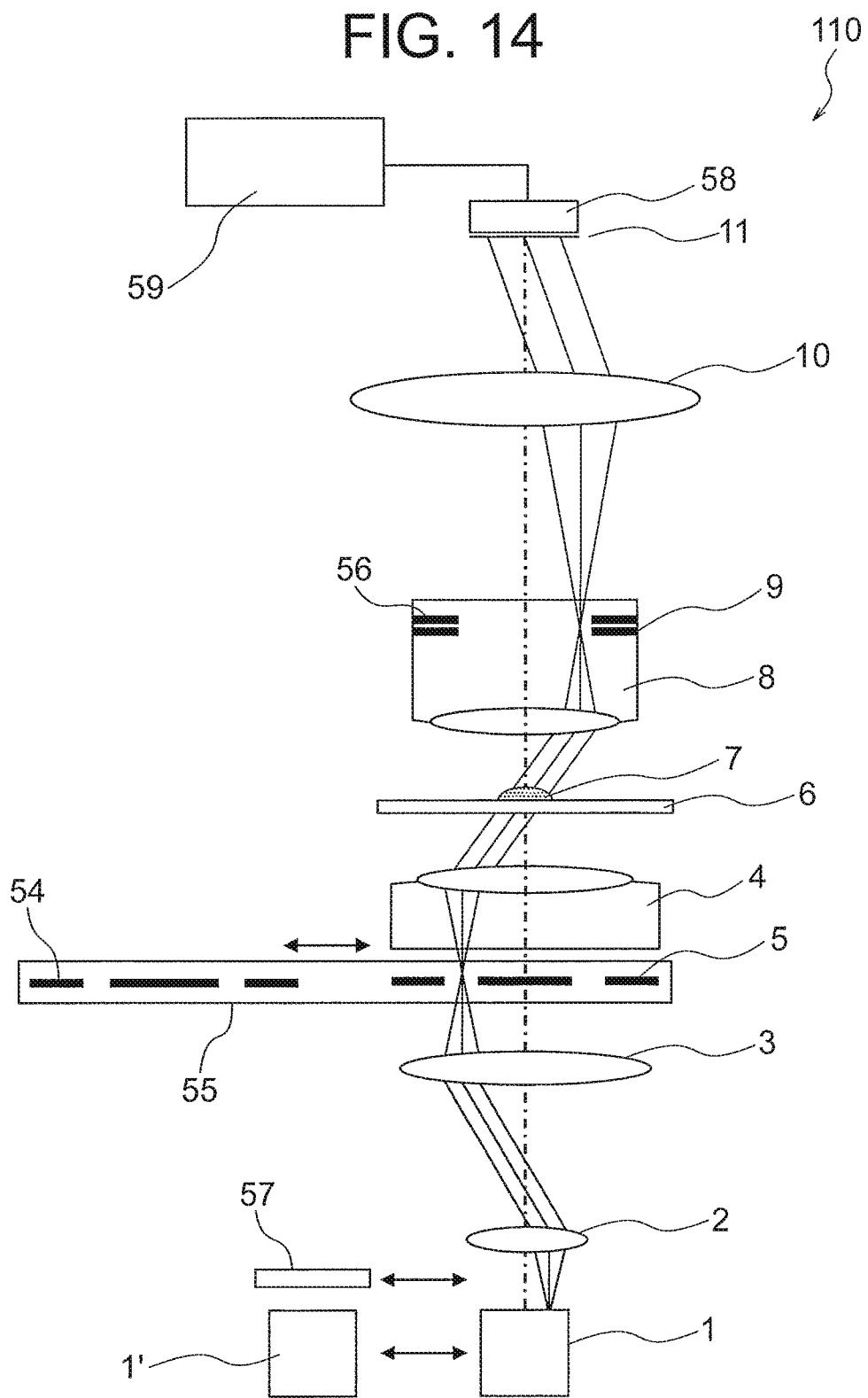

SAMPLE OBSERVATION DEVICE AND SAMPLE OBSERVATION METHOD

CROSS-REFERENCE TO RELATED APPLICATION

The present application is a continuation application of PCT/JP2014/078424 filed on Oct. 20, 2014; the entire contents of which are incorporated herein by reference.

BACKGROUND OF THE INVENTION

Field of the Invention

The present invention relates to a sample observation device and a sample observation method.

Description of the Related Art

As a method for observing a colorless and transparent sample, modulation contrast method is available. In an observation device using the modulation contrast method, an aperture plate is disposed at the illumination optical system, and a modulator is disposed at the observation optical system. Here, the aperture plate is conjugate to the modulator. Moreover, at the aperture plate, a rectangular transmission part is formed at a position away from the optical axis (the center of the aperture plate). Meanwhile, at the modulator, a plurality of regions having mutually different transmittance is formed. These regions are formed to be adjacent to each other. These regions each have a dimension (width) capable of including an image of the transmission part.

As stated above, the transmission part is formed at a position away from the optical axis. Therefore, illumination light passing through the transmission part is emitted from a condenser lens so as to illuminate a sample from an oblique direction. The illumination light emitted from the condenser lens passes through the sample and reaches the modulator. Here, three regions of region A (transmittance 100%), region B (transmittance 20%) and region C (transmittance 0%) are formed at the modulator, for example.

In the case where a surface of the sample is flat, a light flux passing through the sample reaches the region B of the modulator. As a result, a sample image having brightness corresponding to the transmittance of the region B is formed. When the sample surface is an inclined face that is an upward-slope to the right, the light flux is refracted to the right at the time of passing through the sample. In this case, the light flux passing through the sample reaches the region C of the modulator. As a result, a sample image having brightness corresponding to the transmittance of the region C is formed. When the sample surface is an inclined face that is an upward-slope to the left, the light flux is refracted to the left at the time of passing through the sample. In this case, the light flux passing through the sample reaches the region A of the modulator. As a result, a sample image having brightness corresponding to the transmittance of the region A is formed. As just described, when the sample is colorless and transparent, and has a flat face and an inclined face, then the flat face part in the sample image appears gray, and the inclined face part appears black or white.

As just described, in the modulation contrast method, it is possible to observe a colorless and transparent sample as well as an image that has a shadow (contrast) and gives a three-dimensional appearance. As observation devices using the modulation contrast method, observation devices described in Japanese Patent Application Laid-Open No. Sho 51-29149 and Japanese Patent Application Laid-Open No. 2004-126590 are available.

SUMMARY OF THE INVENTION

A sample observation device of the present invention includes:

an illumination optical system and an observation optical system, wherein the illumination optical system includes a light source, a condenser lens, and an aperture member, the observation optical system includes an objective lens and an imaging lens, the aperture member has a light-shielding part or a darkening part, and a transmission part, the aperture member is disposed so that the light-shielding part or the darkening part includes an optical axis of the illumination optical system, the transmission part is located outside of an outer edge of the light-shielding part or the darkening part, an image of the transmission part of the aperture member is formed approximately at a pupil position of the objective lens, an image of an inner edge of the transmission part is formed inside of an outer edge of a pupil of the objective lens, an image of an outer edge of the transmission part is formed outside of the outer edge of the pupil of the objective lens, the image of the transmission part is decentered relative to the pupil of the objective lens due to refraction caused by an object, and the following conditional expressions are satisfied:

$$0.005 \leq \text{Ratio} \leq 0.9$$

$$1.1 \leq I_{0.1}/I_0$$

where
Ratio=$(R_{ob}-R_0 \times \beta)/(R_1 \times \beta - R_{ob})$;
$R_0$ denotes a length from the optical axis of the illumination optical system to the inner edge of the transmission part;
$R_1$ denotes a length from the optical axis of the illumination optical system to the outer edge of the transmission part;
$R_{ob}$ denotes a radius of the pupil of the objective lens; and
$\beta$ denotes a value obtained by dividing a focal length of the objective lens by a focal length of the condenser lens.
$I_{0.1}$ denotes a quantity of light passing through the pupil of the objective lens when $\Delta d=0.1 \times R_{ob}$;
$I_0$ denotes a quantity of light passing through the pupil of the objective lens when $\Delta d=0$; and
$\Delta d$ denotes an amount of displacement of the image of the transmission part of the aperture member relative to the pupil of the objective lens.

Furthermore, a sample observation method of the present invention is a method of observing a sample comprising:

emitting, to the sample, light flux with a predetermined width intersecting the optical axis of an objective lens, wherein the light flux with the predetermined width reaching a pupil position of the objective lens satisfies the following conditions (A), (B), (c) and (D) when the sample is absent:

(A) innermost light of the light flux with the predetermined width is positioned on the inside of the pupil of the objective lens;

(B) outermost light of the light flux with the predetermined width is positioned on the outside of the pupil of the objective lens; and (C) an image of a transmission part of an aperture member that limits the light flux is formed near the pupil of the objective lens, and the width of the light flux positioned on the inside of the pupil of the objective lens is not less than 0.005 times and not more than 0.9 times the width of light flux positioned on the outside of the pupil of the objective lens, and (D) the image of the transmission part is decentered relative to the pupil of the objective lens due to refraction caused by an object, and the following conditional expression is satisfied:

$$1.1 \le I_{0.1}/I_0$$

where $I_{0.1}$ is a quantity of light passing through the pupil of the objective lens when $\Delta d=0.1 \times R_{ob}$;

$I_0$ is a quantity of light passing through the pupil of the objective lens when $\Delta d=0$;

$\Delta d$ is an amount of displacement of the image of the transmission part of the aperture member relative to the pupil of the objective lens; and $R_{ob}$ is a radius of the pupil of the objective lens.

BRIEF DESCRIPTION OF THE DRAWINGS

FIG. 2A is a diagram showing the aperture member made of an opaque member, and FIG. 23 is a diagram showing the aperture member made of a transparent member.

FIG. 3A is a diagram showing the state of refraction of light at the sample position, FIG. 3B is a diagram showing the relationship between the pupil of the objective lens and an image of the aperture member, and FIG. 3C is a diagram showing the state of a light flux passing through the pupil of the objective lens.

FIG. 4A, FIG. 4B and FIG. 4C are diagrams showing the relationship between the pupil of the objective lens and an image of the aperture member when a sample is present, where FIG. 4A is a diagram showing the state of refraction of light at the sample position, FIG. 4B is a diagram showing the relationship between the pupil of the objective lens and an image of the aperture member, and FIG. 4C is a diagram showing the state of a light flux passing through the pupil of the objective lens.

FIG. 6A is a diagram showing the relationship among the length from the optical axis to the inner edge of the transmission part, the length from the optical axis to the outer edge of the transmission part and the radius of the pupil of the objective lens, and FIG. 6B is a diagram showing the displacement of an image of the aperture member with reference to the pupil of the objective lens.

FIG. 7A is a graph showing the relationship between the displacement amount of an image of the aperture member with reference to the pupil of the objective lens, and the amount of a light flux passing through the pupil of the objective lens, and FIG. 7B, FIG. 7C and FIG. 7D are diagrams showing the displacement of an image of the aperture member with reference to the pupil of the objective lens, where FIG. 7B shows the case where no displacement occurs, FIG. 7C shows the case where small displacement occurs, and FIG. 7D shows the case where large displacement occurs.

FIG. 12A is a diagram showing the case where no sample is present, and FIG. 12B is a diagram showing the case where a sample is present.

FIG. 13A is a graph showing the relationship between the displacement amount of an image of the aperture member with reference to the pupil of the objective lens, and the amount of a light flux passing through the pupil of the objective lens, and FIG. 13B, FIG. 13C and FIG. 13D are diagrams showing the displacement of an image of the aperture member with reference to the pupil of the objective lens, where FIG. 913 shows the case where no displacement occurs, FIG. 13C shows the case where small displacement occurs, and FIG. 13D shows the case where large displacement occurs.

FIG. 14 is a diagram showing the configuration of another sample observation device of an embodiment.

DETAILED DESCRIPTION OF THE INVENTION

Figure 1:
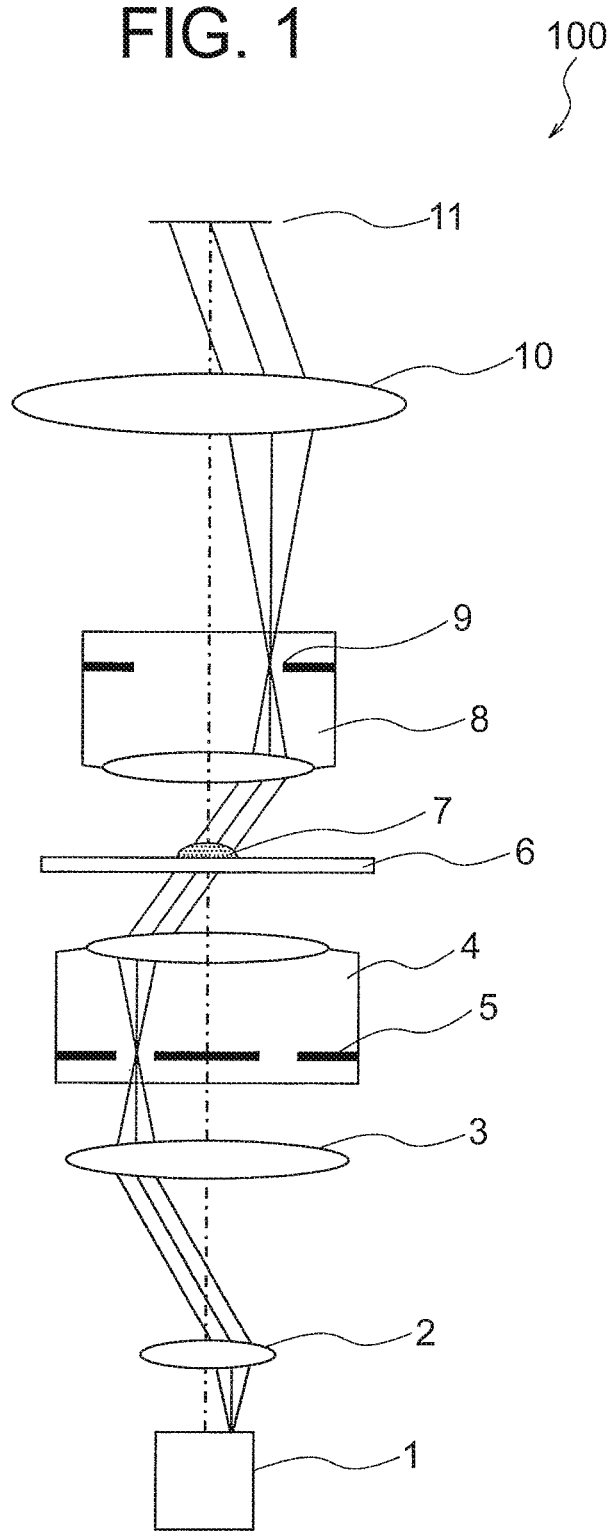
FIG. 1 is a diagram showing the configuration of a sample observation device of an embodiment.

Action and effect of embodiments according to certain aspects of the present invention will be described below. An action and effect of the present embodiment will be described specifically by describing concrete examples. However, the aspects exemplified thereof are some of the aspects included in the present invention, and there is a large number of variations in these aspects. Therefore, the present invention is not restricted to the aspects that are exemplified.

A sample observation method of an embodiment and a sample observation device of an embodiment are described below. The sample observation device and the sample observation method in the following each embodiment is used in a state of bright-field observation. In the bright-field observation of the present embodiment, a fluorescent mirror unit including an excitation filter, a dichroic mirror, and an absorption filter is not used as with fluorescent observation. Therefore, in the state of bright-field observation, when a sample is colorless and transparent, the wavelength band of light forming a sample image (hereinafter, referred to as the "imaging light" as appropriate) agrees with a part of the wavelength band of light illuminating the sample (hereinafter, referred to as the "illumination light" as appropriate), or the wavelength band of the imaging light agrees with the wavelength band of the illumination light.

Moreover, in the bright-field observation of the sample observation device and the sample observation method of the present embodiment, a phase film in phase-contrast observation or a differential interference prism in differential interference observation is not used. Moreover, in the bright-field observation of the present embodiment, a modulator in the modulation contrast observation is not used.

A sample observation device of the present embodiment includes an illumination optical system and an observation optical system, and the illumination optical system includes a light source, a condenser lens, and an aperture member, and the observation optical system includes an objective lens and an imaging lens, and the aperture member has a light-shielding part or a darkening part, and a transmission part, and the aperture member is disposed so that the light-shielding part or the darkening part includes an optical axis of the illumination optical system, and the transmission part is located outside of the outer edge of the light-shielding part or the darkening part, and an image of the inner edge of the transmission part is formed inside of the outer edge of a pupil of the objective lens, and an image of the outer edge of the transmission part is formed outside the outer edge of the pupil of the objective lens, the following conditional expression (1) is satisfied:

$$0.005 \leq \text{Ratio} \leq 0.9 \quad (1)$$

where
Ratio=$(R_{ob}-R_0\times\beta)/(R_1\times\beta-R_{ob})$;
$R_0$ denotes a length from the optical axis of the illumination optical system to the inner edge of the transmission part;
$R_1$ denotes a length from the optical axis of the illumination optical system to the outer edge of the transmission part;
$R_{ob}$ denotes a radius of the pupil of the objective lens; and
$\beta$ denotes a value obtained by dividing a focal length of the objective lens by a focal length of the condenser lens.

The sample observation device of the present embodiment will be described. In the following description, the case where the aperture member has a light-shielding part will be described first and, the case where the aperture member has a darkening part will be described next.

A sample observation device of the present embodiment includes an illumination optical system and an observation optical system, and the illumination optical system includes a light source, a condenser lens and an aperture member, and the observation optical system includes an objective lens and an imaging lens, and the aperture member has a light-shielding part and a transmission part, and the aperture member is disposed so that the light-shielding part includes an optical axis of the illumination optical system, and the transmission part is located outside of an outer edge of the light-shielding part, and an image of an inner edge of the transmission part is formed inside of an outer edge of the pupil of the objective lens, and an image of an outer edge of the transmission part is formed outside of the outer edge of the pupil of the objective lens.

Referring to FIG. 1, the sample observation device of the present embodiment is described below. FIG. 1 is a diagram showing the configuration of the sample observation device of the present embodiment.

A sample observation device 100 is an upright microscope, for example, which includes an illumination optical system and an observation optical system. The illumination optical system includes a light source 1, a condenser lens 4 and an aperture member 5. The illumination optical system includes a lens 2 and a lens 3 as needed. Meanwhile, the observation optical system includes an objective lens 8 and an imaging lens 10.

Light emitted from the light source 1 passes through the lens 2 and the lens 3, and reaches the condenser lens 4. At the condenser lens 4, the aperture member 5 is provided. Herein, the condenser lens 4 and the aperture member 5 are integrally configured. However, the aperture member 5 and the condenser lens 4 may be configured as separate bodies.

Figure 2A:
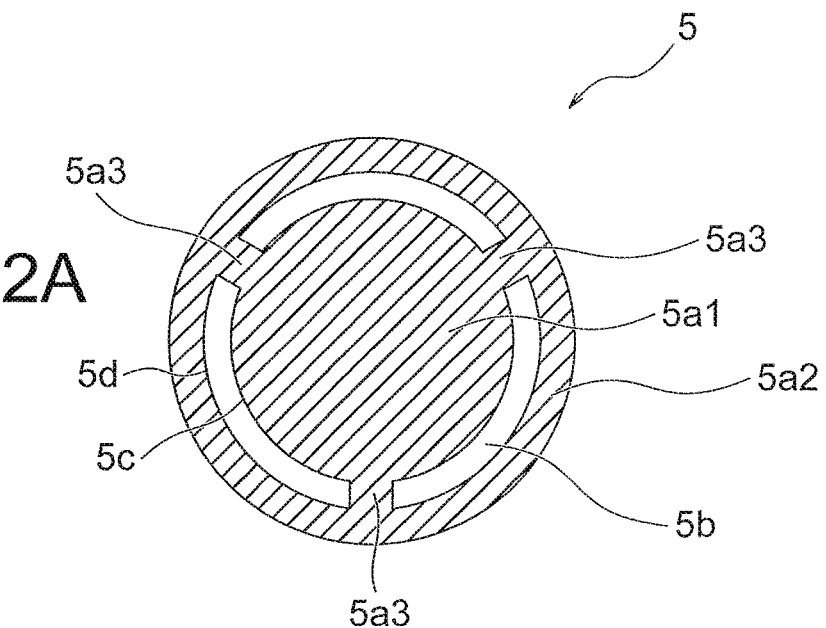
FIG. 2A and FIG. 2B are diagrams showing the configuration of an aperture member, where
Figure 2B:
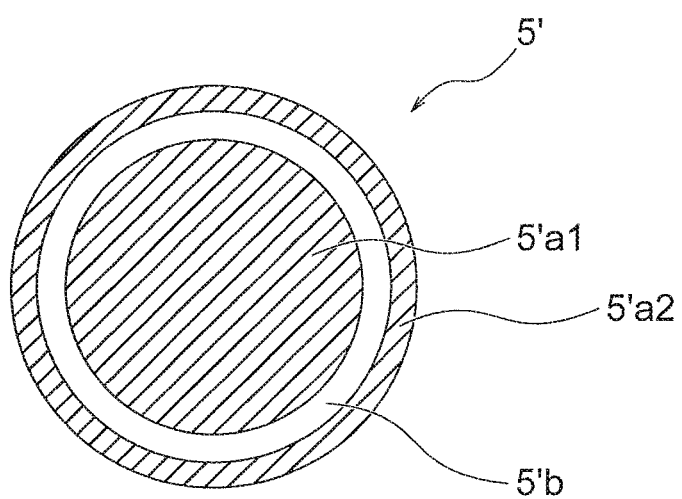

The aperture member 5 is described below. The configuration of the aperture member is shown in FIG. 2A and FIG. 2B. FIG. 2A shows the aperture member made of an opaque member, and FIG. 2B shows the aperture member made of a transparent member.

As shown in FIG. 2A, the aperture member 5 includes a light-shielding part 5a1 and a transmission part 5b. Further, the aperture member 5 includes a light-shielding part 5a2. The light-shielding parts 5a1 and 5a2 are made of an opaque member, such as a metal plate. The transmission part 5b is a gap (hole) bored at the metal plate.

At the aperture member 5, three connecting parts 5a3 are formed between the light-shielding part 5a1 and the light-shielding part 5a2 to hold the light-shielding part 5a1. Therefore, the transmission part 5b is divided three parts. The shape of each transmission part 5b is a substantially fan-like shape (discrete ring-band shape). The number of the connecting parts 5a3 is not limited to three.

The aperture member 5 is disposed so that the light-shielding part 5a1 includes the optical axis of the illumination optical system. The light-shielding part 5a1 has an outer edge 5c that is at a position away from the optical axis of the illumination optical system by predetermined distance. Therefore, the illumination light incident on the aperture member 5 is shielded at the center of the light flux by the light-shielding part 5a1. Here, the boundary between the light-shielding part 5a1 and the transmission part 5b corresponds to the outer edge 5c of the light-shielding part 5a1.

The light-shielding part 5a2 is located outside (direction moving away from the optical axis) of the light-shielding part 5a1 and the transmission part 5b. Here, the boundary between the transmission part 5b and the light-shielding part 5a2 corresponds to an inner edge 5d of the light-shielding part 5a2.

The transmission part 5b is located outside of the outer edge 5c of the light-shielding part 5a1. Here, the boundary between the light-shielding part 5a1 and the transmission part 5b corresponds to the inner edge of the transmission part 5b. Moreover, the boundary between the transmission part 5b and the light-shielding part 5a2 corresponds to the outer edge of the transmission part 5b. Therefore, 5c represents the outer edge of the light-shielding part 5a1 and the inner edge of the transmission part 5b, and 5d represents the inner edge of the light-shielding part 5a2 and the outer edge of the transmission part 5b.

Moreover, as shown in FIG. 2B, an aperture member 5' includes a light-shielding part 5'a1 and a transmission part 5'b. Further, the aperture member 5' includes a light-shielding part 5'a2. The light-shielding parts 5'a1 and 5'a2, and the transmission part 5'b are made of a transparent member, such as a glass plate or a resin plate. The light-shielding parts 5'a1 and 5'a2 are formed by applying light-shielding paint on a glass plate. On the other hand, nothing is applied to the transmission part 5'b. Therefore, the transmission part 5'b is a glass plate as it is.

At the aperture member 5', a shape of the transmission part 5'b is an annulus. This is because there is no need to hold the light-shielding part 5'a2. Therefore, at the aperture member 5', a connecting part does not formed between the light-shielding part 5'a1 and the light-shielding part 5'a2.

A major difference between the aperture member 5' and the aperture member 5 are the material, and the presence or not of the connecting part. Therefore, the detailed descriptions of the light-shielding part 5'a1 and 5'a2, and the transmission part 5'b are omitted.

The light-shielding part 5a2 and the connecting parts 5a3 of the aperture member 5, and the light-shielding part 5'a2 of the aperture member 5' are not always required. For instance, the size (diameter) of a light flux of the illumination light may correspond to the outer edge of the transmission part 5b or the outer edge of the transmission part 5'b.

As described above, the aperture member 5, 5' includes the light-shielding part 5a1, 5'a1 and the transmission part 5b, 5'b. Therefore, an illumination light having a substantially annular shape or an annular shape (hereinafter, referred to as "annular shape" as appropriate) emanates form the aperture member 5, 5'.

Referring back to FIG. 1, the description is continued. The aperture member 5 is conjugate to the light source 1. Therefore, the illumination light emitted from the light source 1 is collected at the position of the aperture member 5. That is, an image of the light source 1 is formed at the position of the aperture member 5.

Illumination light emitted from the aperture member 5 enters the condenser lens 4. Here, the position of the aperture member 5 coincides with the focal position of the condenser lens 4 (or the pupil position of the condenser lens 4). Therefore, the illumination light emitted from the condenser lens 4 becomes parallel light. Moreover, since a shape of the transmission part is an annular shape, a shape of the illumination light also is an annular shape. Therefore, the illumination light emitted from the condenser lens 4 is emitted so as to intersect with the optical axis of the observation optical system (the optical axis of the illumination optical system).

The illumination light emitted from the condenser lens 4 reaches a sample 7. The sample 7 is placed on a holding member 6. The sample 7 is a cell, for example, which is colorless and transparent.

The light passing through the sample 7, i.e., imaging light enters a microscope objective lens 8 (hereinafter, referred to as an "objective lens" as appropriate). This objective lens 8 is a microscope objective lens for bright-field observation, for example. Therefore, only a lens is present in the optical path of the objective lens 8, and no optical member to change the intensity or the phase of light, such as a phase plate or a modulation plate, is not present in the optical path.

The imaging light emitted from the objective lens 8 enters the imaging lens 10. Then, an image of the sample 7 is formed at an image position 11 by the imaging light emitted from the imaging lens 10.

As shown in FIG. 1, parallel light passing through the sample 7 is collected at a pupil 9 of the objective lens. As just described, the pupil 9 of the objective lens is conjugate to the aperture member 5. Therefore, an image of the aperture member 5 is formed at the position of the pupil 9 of the objective lens.

The relationship between the pupil 9 of the objective lens and an image of the aperture member 5 are described below.

Let that, in the following description, the aperture members' shown in FIG. 2B is used as the aperture member.

Figure 3A:
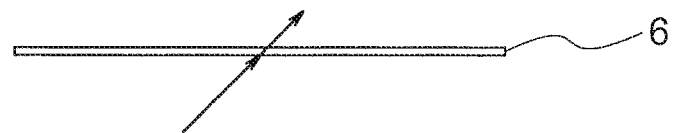
FIG. 3A, FIG. 3B and FIG. 3C are diagrams showing the relationship between the pupil of the objective lens and an image of the aperture member when no sample is present, where
Figure 3B:
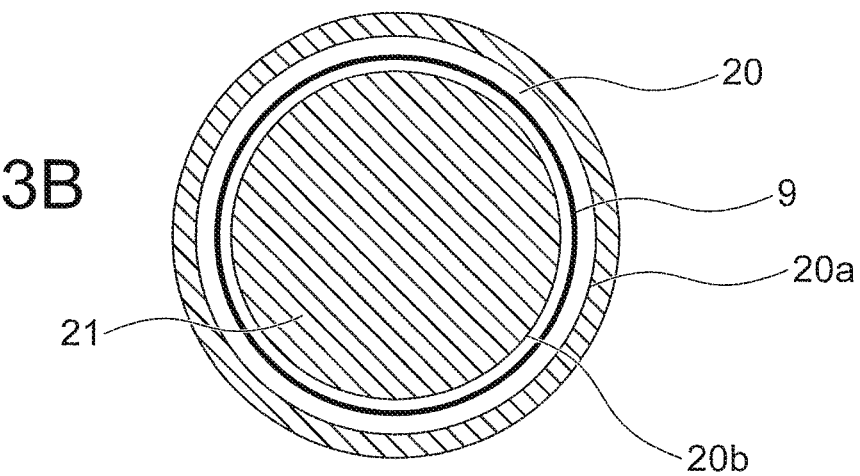
Figure 3C:
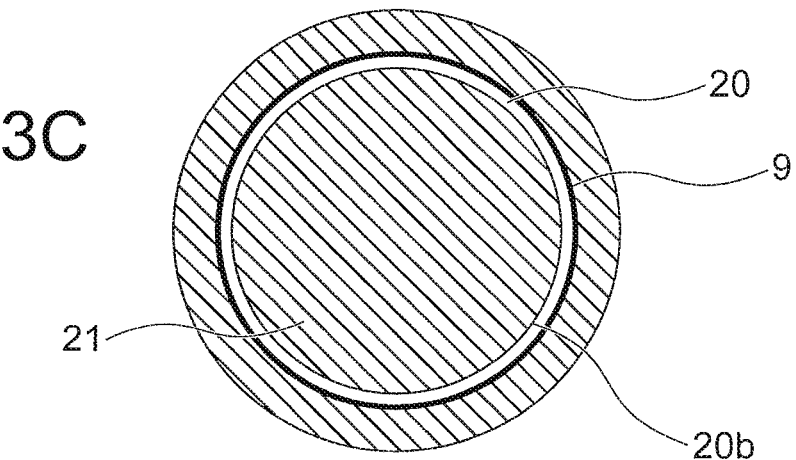

FIG. 3A, FIG. 3B and FIG. 3C are diagrams showing the relationship between the pupil of the objective lens and an image of the aperture member when no sample is present. FIG. 3A is a diagram showing the state of refraction of light at the sample position, FIG. 3B is a diagram showing the relationship between the pupil of the objective lens and an image of the aperture member, and FIG. 3C is a diagram showing the state of a light flux passing through the pupil of the objective lens. The case where a sample is present but its surface is flat, is included in the case where no sample is present.

Moreover, FIG. 4A, FIG. 4B and FIG. 4C are diagrams showing the relationship between the pupil of the objective lens and an image of the aperture member when a sample is present. FIG. 4A is a diagram showing the state of refraction of light at the sample position, FIG. 4B is a diagram showing the relationship between the pupil of the objective lens and an image of the aperture member, and FIG. 40 is a diagram showing the state of a light flux passing through the pupil of the objective lens. The case where a sample is present refers to the case where the surface of the sample is inclined (not-flat). Therefore, the case where a sample is present but its surface is flat, is not included in the case where a sample is present.

In the case where no sample is present, as shown in FIG. 3A, the direction of the light becomes same between light incident on the holding member 6 and light emitted from the holding member 6. As a result, an image of the aperture member formed at the pupil position of the objective lens becomes as shown in FIG. 3B. The circle (circumference) indicated with numeral 9 is the outer edge of the pupil of the objective lens, and the inside of the circle (circumference) is the pupil of the objective lens.

As shown in FIG. 3B, a shape of an image 20 of the transmission part is an annulus, a shape of an image 21 of the light-shielding part is a circle, and a shape of the pupil 9 of the objective lens is a circle. Then, the image 20 of the transmission part, the image 21 of the light-shielding part, and the pupil 9 of the objective lens are concentric. Moreover, the center of the image 20 of the transmission part, the center of the image 21 of the light-shielding part, and the center of the pupil 9 of the objective lens coincide with each other. The image 21 of the light-shielding part is an image of the light-shielding part 5a1 or 5'a1 in FIG. 2A or FIG. 2B, for example.

Here, the center of the image 20 of the transmission part refers to the center of a circle defining an image 20a of the outer edge of the transmission part (since the image 20 of the transmission part is annulus, the center of the image 20 of the transmission part is the center of the circle defining an image 20b of the inner edge of the transmission part as well).

Then, the image 20b of the inner edge of the transmission part is located inside (the direction approaching the optical axis) of the outer edge of the pupil 9 of the objective lens. Moreover, the image 20a of the outer edge of the transmission part is located outside (the direction moving away from the optical axis) of the outer edge of the pupil 9 of the objective lens. As just described, in the sample observation device of the present embodiment, the image 20b of the inner edge of the transmission part is formed inside of the outer edge of the pupil 9 of the objective lens, and the image 20a of the outer edge of the transmission part is formed outside of the outer edge of the pupil 9 of the objective lens.

Here, light outside of the outer edge of the pupil 9 of the objective lens does not pass through the pupil 9 of the objective lens (is not emitted from the objective lens 8). Therefore, as shown in FIG. 3C, the region of a light flux passing through the pupil 9 of the objective lens is the region between the image 20b of the inner edge of the transmission part and the outer edge of the pupil 9 of the objective lens. Then, the area of this region as a whole corresponds to the brightness of the sample image.

On the other hand, in the case where a sample is present, as shown in FIG. 4A, the direction of the light becomes different between light incident on the holding member 6 and light emitted from the sample. As a result, an image of the aperture member formed at the pupil position of the objective lens becomes as shown in FIG. 4B. In FIG. 4B also, the circle (circumference) indicated with numeral 9 is the outer edge of the pupil of the objective lens, and the inside of the circle (circumference) is the pupil of the objective lens.

As shown in FIG. 4B, a shape of an image 20 of the transmission part is an annulus, a shape of an image 21 of the light-shielding part is a circle, and a shape of the pupil 9 of the objective lens is a circle. However, the image 20 of the transmission part and the image 21 of the light-shielding part, and the pupil 9 of the objective lens are not concentric. Moreover, the center of the image 20 of the transmission part and the center of the image 21 of the light-shielding part, and the center of the pupil 9 of the objective lens do not coincide with each other. That is, the center of the image 20 of the transmission part and the center of the image 21 of the light-shielding part shift to the left on the sheet with reference to the center of the pupil 9 of the objective lens.

Moreover, as shown in FIG. 4C, the region where a light flux passes through the pupil 9 of the objective lens is the region between the image 20b of the inner edge of the transmission part and the outer edge of the pupil 9 of the objective lens. Then, the area of this region as a whole corresponds to the brightness of the sample image.

Here, in FIG. 4B, the image 20b of the inner edge of the transmission part is located inside of the outer edge of the pupil 9 of the objective lens. In other words, in FIG. 4B, the image 21 of the light-shielding part is located inside of the outer edge of the pupil 9 of the objective lens. This is because the inclination of the surface of the sample is small. On the other hand, in the case where no sample is present as well, the image 21 of the light-shielding part is located inside of the outer edge of the pupil 9 of the objective lens. Therefore, even in the case where a sample is present, if the inclination of the surface of the sample is small, brightness of the sample image will be the same as in the case where no sample is present.

However, when the inclination of the sample surface becomes larger, displacement of the center of the image 20 of the transmission part with reference to the center of the pupil 9 of the objective lens (hereinafter, referred to as "displacement of an image of a transmission part" as appropriate) becomes larger. In this case, as described later, a part of the image 20b of the inner edge of the transmission part will be located outside of the outer edge of the pupil 9 of the objective lens (as shown in FIG. 7O and FIG. 7D). Moreover, a part of the image 20a of the outer edge of the transmission part will be located inside of the outer edge of the pupil 9 of the objective lens. In other words, a part of the image 21 of the light-shielding part is located outside of the outer edge of the pupil 9 of the objective lens. As a result, the region of a light flux passing through the pupil 9 of the objective lens changes greatly. That is, the brightness of the sample image is different from that in the case where no sample is present.

With this method, in the sample observation device of the present embodiment, a change in shape at the sample (change in inclination) is converted into a change in displacement of the image of the transmission part. Then, the change in displacement of the image of the transmission part causes a change in the amount of a light flux passing through the pupil of the objective lens. That is, the change in shape at the sample can be detected as a change in brightness. As a result, even when the sample is colorless and transparent, it is possible to obtain a sample image with shadow.

Further, in the sample observation device of the present embodiment, there is no need to use a modulator as in the modulation contrast method. Therefore, there is no need to perform positioning of the aperture member with reference to a modulator. As a result, the positioning of the aperture member can be simplified. Further, since no modulator is used, an objective lens for bright-field observation method can be used as the objective lens. Therefore, various observation methods (e.g., bright-field observation, fluorescent observation and polarization observation) can be performed easily with one objective lens.

Moreover, although the generated direction of shadow depends on the direction of displacement of the image 20 of the transmission part with reference to the pupil 9 of the objective lens, the direction of displacement of the image of the transmission part is not limited. Therefore, in the sample observation device of the present embodiment, the generated direction of shadow is not limited.

Figure 5:
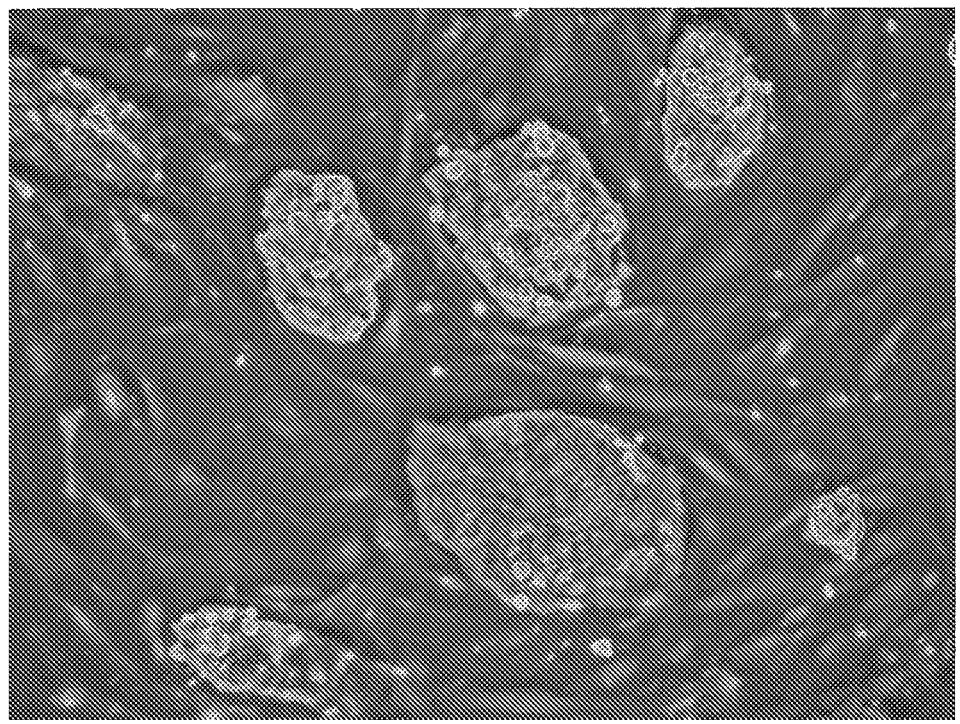
FIG. 5 is an electronic image of a sample obtained by the sample observation device of the present embodiment.

FIG. 5 shows an example of the observation result in the sample observation device of the present embodiment. FIG. 5 is an electronic image of a cell. As shown in FIG. 5, according to the sample observation device of the present embodiment, it is possible to observe the outline of a colorless and transparent cell or its internal structure clearly.

With this configuration, it is possible to detect a change in shape at the sample as a change in brightness.

Figure 6A:
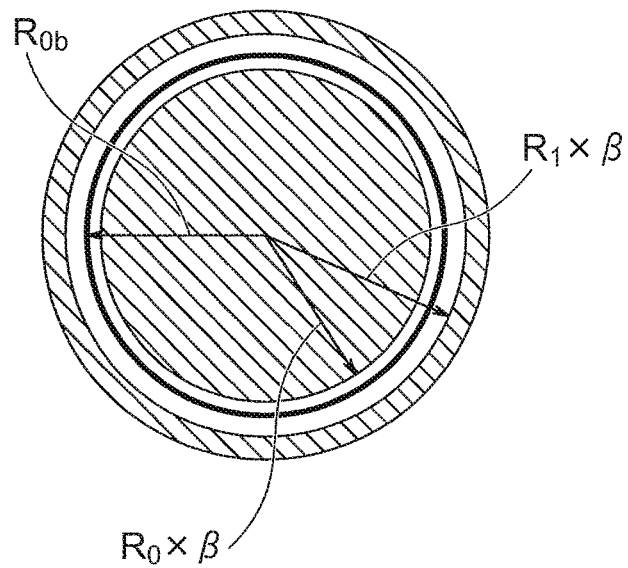
FIG. 6A and FIG. 6B are diagrams showing the relationship between the pupil of the objective lens and an image of the aperture member, where
Figure 6B:
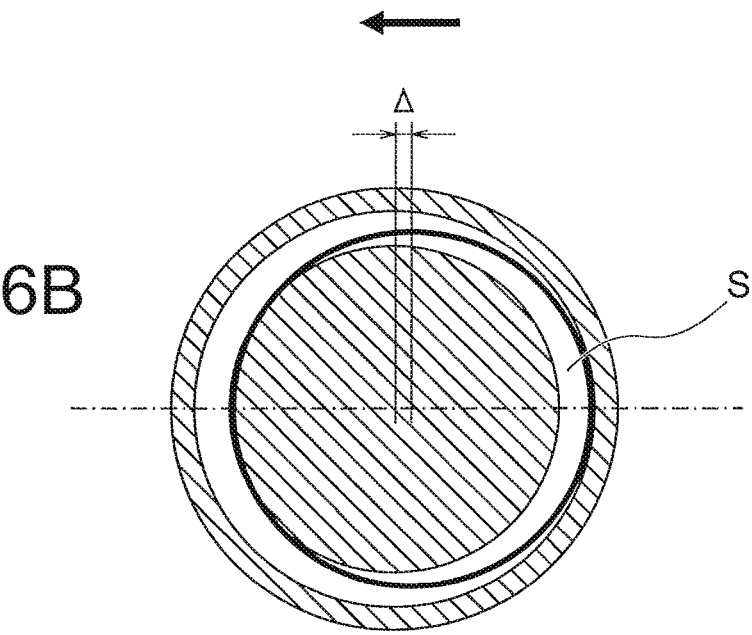

Relationship between the pupil of the objective lens and an image of the aperture member will be further described. FIG. 6A and FIG. 6B are diagrams showing the relationship between the pupil of the objective lens and an image of the aperture member. Here, FIG. 6A shows the relationship among the length $R_0$ from the optical axis to the inner edge of the transmission part, the length $R_1$ from the optical axis to the outer edge of the transmission part, and the radius $R_{ob}$ of the pupil of the objective lens.

As shown in FIG. 6A, the relationship among $R_0$, $R_1$ and $R_{ob}$ is $R_0 \times \beta < R_{ob}$, $R_{ob} < R_1 \times \beta$. By satisfying $R_0 \times \beta < R_{ob}$, an image of the inner edge of the transmission part is formed inside of the outer edge of the pupil of the objective lens. By satisfying $R_{ob} < R_1 \times \beta$, an image of the outer edge of the transmission part is formed outside of the outer edge of the pupil of the objective lens. As a result, it is possible to detect a change in shape at the sample as a change in brightness.

It is preferable that the shape of the aperture member is an axis symmetrical shape. With this configuration, the generated direction of shadow is not limited.

As the axis symmetrical shape, a circle and a polygon are available, for example. When the shape of the light-shielding part is made to be a circle and the shape of the transmission part is made to be an annulus, then $R_0$ denotes the radius of the inner edge of the annulus, and $R_1$ denotes the radius of the outer edge of the annulus. When the shape of the light-shielding part is made to be a polygon and the shape of the transmission part is made to be an annular polygon, then $R_0$ denotes the radius of a circle inscribed in the polygon inside of the transmission part, and $R_1$ denotes the radius of a circle circumscribed in the polygon outside of the transmission part.

Moreover, in the sample observation device of the present embodiment, at the pupil position of the objective lens, a center of the image of the transmission part preferably coincides with a center of the pupil of the objective lens.

With this configuration, the generated direction of shadow is not limited.

FIG. 6B is a diagram showing the displacement of an image of the aperture member with reference to the pupil of the objective lens. In FIG. 6B, the center of the image of the aperture member is displaced from the center of the pupil of the objective lens. In the drawing, Δ denotes the amount of the displacement, and S denotes the region (area) of a light flux passing through the pupil of the objective lens. In FIG. 6B, a shape of the image of the light-shielding part (e.g., the image 21 of the light-shielding part in FIG. 3B) is a circle and a shape of the image of the transmission part is an annulus, and they are concentric. In this case, the displacement of the image of the transmission part is equal to the displacement of the center of the image of the aperture member with reference to the center of the pupil of the objective lens. Therefore, the displacement amount Δ in FIG. 6B also is the displacement amount of the image of the transmission part.

In FIG. 6B, when the displacement amount Δ is changed, the area S also changes. Then, the result of calculating the area S while changing the displacement amount Δ is shown in FIG. 7A, FIG. 7B, FIG. 7C and FIG. 7D. FIG. 7A is a graph showing the relationship between the displacement amount of an image of the aperture member with reference to the pupil of the objective lens, and the amount of a light flux passing through the pupil of the objective lens, and FIG. 7B, FIG. 7C and FIG. 7D are diagrams showing the displacement of an image of the aperture member with reference to the pupil of the objective lens. Here, FIG. 7B shows the case where no displacement occurs, FIG. 7C shows the case where small displacement occurs, and FIG. 7D shows the case where large displacement occurs.

In FIG. 7A, calculation is performed based on $R_0 \times \beta = 0.97 \times R_{ob}$, $R_1 \times \beta = 1.15 \times R_{ob}$. The transmittance of the transmission part is 100%. Moreover, in FIG. 7A, the numerical values on the horizontal axis represent the displacement amount Δ that is normalized with the radius $R_{ob}$ of the pupil of the objective lens. The numerical values on the vertical axis are obtained by normalizing with the area $(\pi(R_{ob}^2 - (R_0 \times \beta)^2))$ when the displacement amount Δ is 0.

The area S indicates the area of a light flux passing through the pupil of the objective lens. Therefore, the area S can be replaced with the amount I of the light flux. Then, in FIG. 7A, I is used as a variable of the vertical axis.

In the case where no sample is present (alternatively, the surface of the sample is flat), the displacement amount Δ is 0. In this case, the relationship between the pupil of the objective lens and an image of the aperture member becomes as in A (FIG. 7B). Therefore, the amount I of the light flux becomes 1 as shown in arrow A.

Next, in the case where a sample is present, the displacement amount Δ is not 0. Here, when the inclination of the sample surface is small, the relationship between the pupil of the objective lens and an image of the aperture member becomes as in B (FIG. 7C). However, although A and B differ in the position of the image of the light-shielding part in the pupil of the objective lens, the image of the light-shielding part is located inside of the outer edge of the pupil of the objective lens in both cases. Accordingly, the amount I of the light flux becomes 1 as shown in arrow B.

On the other hand, when the inclination of the sample surface is large, the relationship between the pupil of the objective lens and an image of the aperture member becomes as in C. In this case, a part of the image of the light-shielding part is located outside of the pupil of the objective lens (FIG. 7D). Therefore, the amount I of the light flux becomes more than 1 as shown in arrow C.

As just described, in the sample observation device of the present embodiment, the amount I of a light flux changes with a change in the displacement amount Δ between arrow B and arrow C. Therefore, according to the sample observation device of the present embodiment, it is possible to detect a change in shape at the sample as a change in brightness. As a result, even when the sample is colorless and transparent, it is possible to obtain a sample image with shadow.

In the present embodiment, "the image of the inner edge of the transmission part is formed inside of the outer edge of the pupil of the objective lens" includes not only the case where the entire image of the inner edge of the transmission part is included inside of the outer edge of the pupil of the objective lens as shown in FIG. 7B, but also the case where a part of the image of the inner edge of the transmission part is included as shown in FIG. 7C.

Then, in the sample observation device of the present embodiment, the following conditional expression (1) is satisfied:

$$0.005 \leq \text{Ratio} \leq 0.9 \quad (1)$$

where
Ratio = $(R_{ob} - R_0 \times \beta)/(R_1 \times \beta - R_{ob})$;

$R_0$ denotes the length from the optical axis of the illumination optical system to the inner edge of the transmission part;

$R_1$ denotes the length from the optical axis of the illumination optical system to the outer edge of the transmission part;

$R_{ob}$ denotes the radius of the pupil of the objective lens; and

β denotes the value obtained by dividing the focal length of the objective lens by the focal length of the condenser lens.

The conditional expression (1) is a conditional expression that represents an appropriate ratio between the size of the image of the transmission part formed inside the outer edge of the pupil 9 of the objective lens and the size of the image of the transmission part formed outside the outer edge of the pupil 9 of the objective lens.

Before the technical meaning of the conditional expression (1) is described, the technical meaning of each of $R_{ob} - R_0 \times \beta$ and $R_1 \times \beta - R_{ob}$ will be described.

Figure 8:
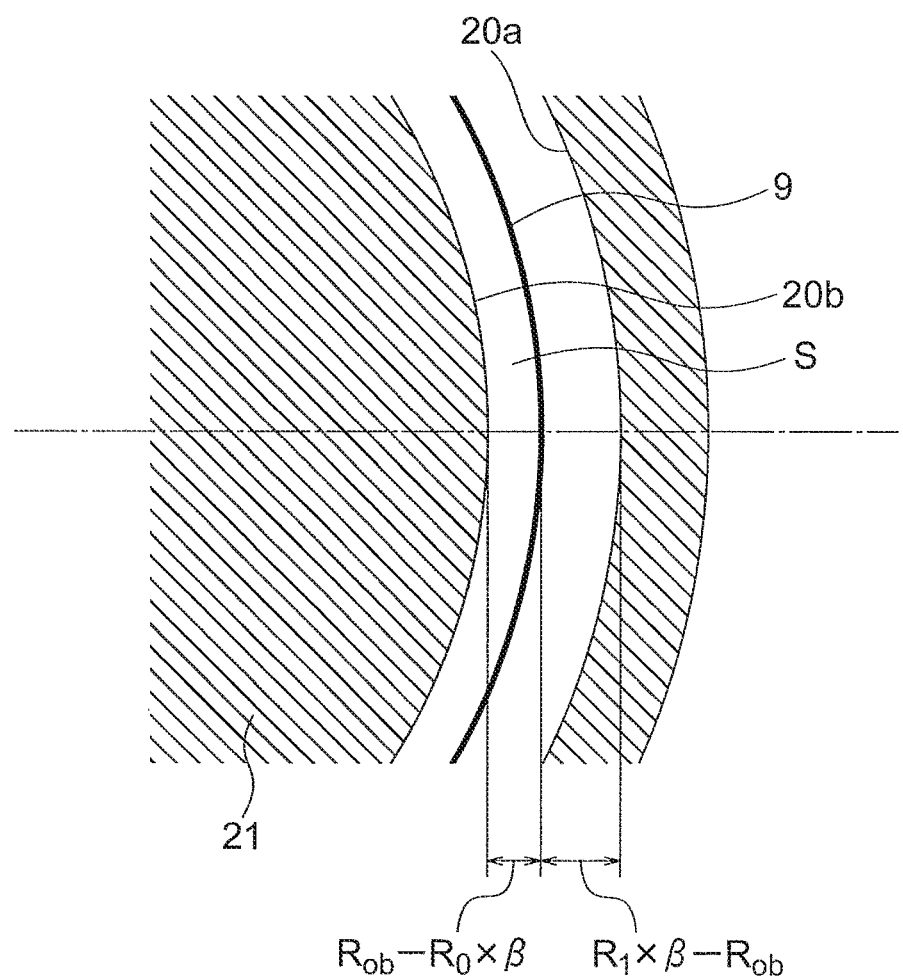
FIG. 8 is a diagram showing the relation between the image of the transmission part and the pupil of the objective lens.

FIG. 8 is a diagram showing the relation between the image of the transmission part and the pupil of the objective lens. As shown in FIG. 8, $R_{ob} - R_0 \times \beta$ represents the distance between the outer edge of the pupil 9 of the objective lens and the image 20b of the inner edge of the transmission part, and $R_1 \times \beta - R_{ob}$ represents the distance between the outer edge of the pupil 9 of the objective lens and the image 20a of the outer edge of the transmission part.

First, $R_{ob} - R_0 \times \beta$ will be described. It is assumed that $R_1 \times \beta - R_{ob}$ is fixed.

In FIG. 8, the area S shows the range of light flux passing through the pupil of the objective lens. The range of light flux passing through the pupil of the objective lens represents the brightness of the image. Thus, the size of the area S represents the brightness of the image. Here, $R_{ob}-R_0\times\beta$ and the area S are in a proportional relationship. Thus, when $R_{ob}-R_0\times\beta$ increases, the brightness of the image increases.

Furthermore, as shown in FIG. 7C and FIG. 7D, as the inclination of the surface of the sample increases, the image 21 of the light-shielding part is displaced from the center of the pupil 9 of the objective lens. However, as shown in FIG. 7C, the image 21 of the light-shielding part is positioned on the inside of the outer edge of the pupil of the objective lens until the position of the image 20b of the inner edge of the transmission part coincides with the outer edge of the pupil 9 of the objective lens. In this range (between A and B in FIG. 7A), the brightness of the image does not change because the value of the area S does not change.

Figure 9:
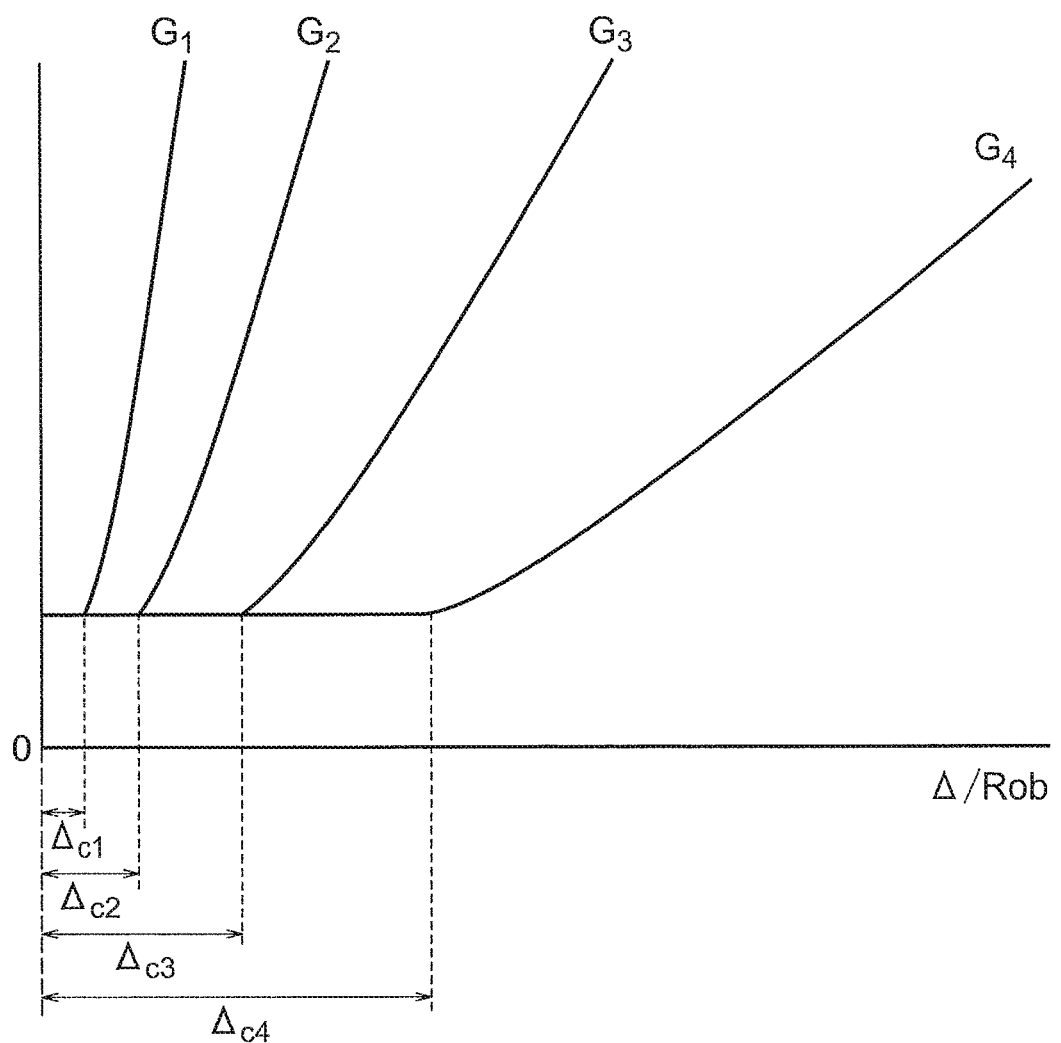
FIG. 9 is a diagram showing the relation between the amount of displacement $\Delta$ and a change in quantity of light flux I (the brightness of the image)

FIG. 9 is a diagram showing the relation between the amount of displacement Δ and a change in quantity of light flux I (the brightness of the image). Here, the change in brightness is shown for the different values of $R_{ob}-R_0\times\beta$. The values of $R_{ob}-R_0\times\beta$ satisfy $G_1<G_2<G_3<G_4$, and $\Delta_{c1}$ to $\Delta_{c4}$ show the maximum amount of displacement Δ (hereinafter referred to as "the maximum amount of displacement $\Delta_c$") when the brightness of the image does not change.

$R_{ob}-R_0\times\beta$ represents the distance between the position of the image 20b of the inner edge of the transmission part and the outer edge of the pupil 9 of the objective lens until both edges coincide. As described above, the brightness of the image does not change until the position of the image 20b of the inner edge of the transmission part coincides with the outer edge of the pupil 9 of the objective lens. Thus, as shown in FIG. 9, when $R_{ob}-R_0\times\beta$ decreases, the maximum amount of displacement $\Delta_c$ also decreases.

When the maximum amount of displacement $\Delta_c$ decreases, it is possible to detect a smaller amount of displacement Δ. Here, the amount of displacement Δ and the magnitude of the inclination of the surface of the sample are in a proportional relationship. Thus, it is possible to detect a smaller inclination when the maximum amount of displacement $\Delta_c$ decreases.

As described above, as $R_{ob}-R_0\times\beta$ decreases, the maximum amount of displacement $\Delta_c$ decreases. Thus, it is possible to detect a smaller inclination as $R_{ob}-R_0\times\beta$ decreases.

Furthermore, as shown in FIG. 7D, when the inclination of the surface of the sample increases, part of the image of the light-shielding part comes to be positioned on the outside of the pupil 9 of the objective lens. Here, the image of the transmission part formed outside the outer edge of the pupil 9 of the objective lens moves to the inside of the pupil 9 of the objective lens. As a result, the area S is larger than when the surface of the sample is flat (the inclination of the surface is zero), and therefore, the brightness of the image increases. Furthermore, the increase in brightness of the image continues while the image of the transmission part formed outside the outer edge of the pupil 9 of the objective lens moves to the inside of the pupil 9 of the objective lens.

The rate of increase in area S relative to the change in inclination, that is, the detection sensitivity for the change in inclination is represented by the slope of each curve shown in FIG. 9. As shown in FIG. 9, the slopes of the curves are $G_4<G_3<G_2<G_1$. Thus, the smaller $R_{ob}-R_0\times\beta$ is, the higher the detection sensitivity is for a change in inclination.

$R_1\times\beta-R_{ob}$ will now be described. It is assumed that $R_{ob}-R_0\times\beta$ is fixed.

As described above, when the inclination of the surface of the sample increases, part of the image of the light-shielding part is positioned on the outside of the pupil 9 of the objective lens, and in addition, the image of the transmission part formed outside the outer edge of the pupil 9 of the objective lens moves to the inside of the pupil 9 of the objective lens. As a result, the area S is larger than when the surface of the sample is flat, and therefore, the brightness of the image increases. Furthermore, the increase in brightness of the image continues while the image of the transmission part formed outside the outer edge of the pupil 9 of the objective lens moves to the inside of the pupil 9 of the objective lens.

Figure 10:
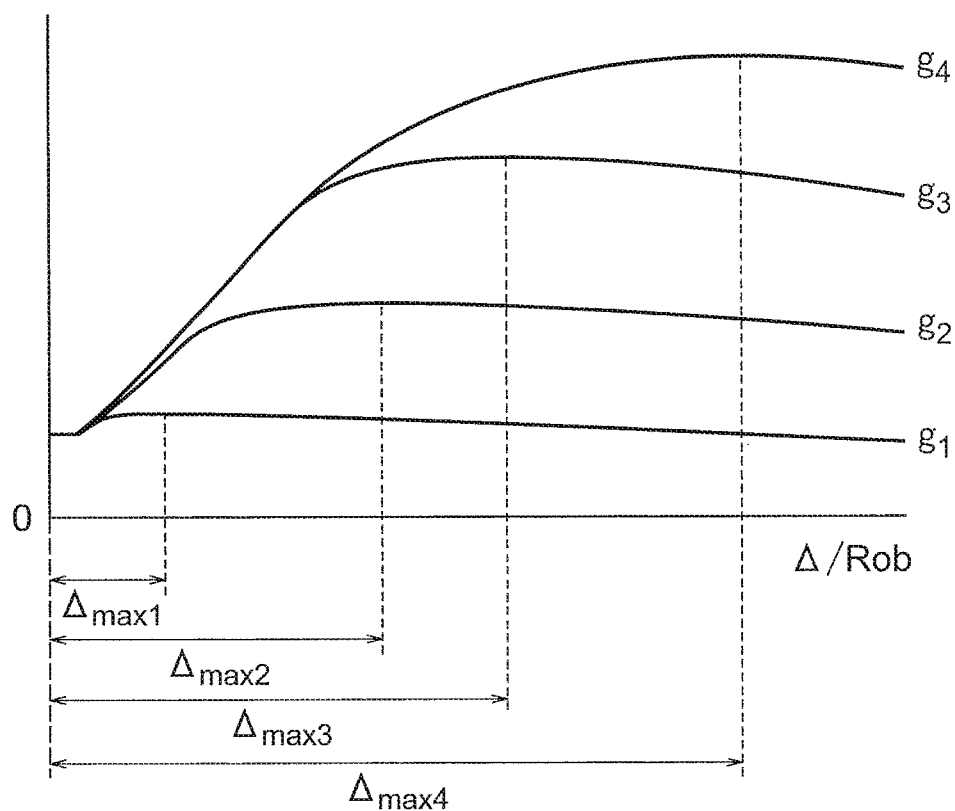
FIG. 10 is a diagram showing the relation between the amount of displacement $\Delta$ and a change in quantity of light flux I (the brightness of the image)

FIG. 10 is a diagram showing the relation between the amount of displacement Δ and a change in quantity of light flux I (the brightness of the image). Here, the change in brightness is shown for the different values of $R_1\times\beta-R_{ob}$. The values of $R_1\times\beta-R_{ob}$ satisfy $g_1<g_2<g_3<g_4$, and $\Delta_{max1}$ to $\Delta_{max4}$ show the maximum amount of displacement Δ (hereinafter referred to as "the maximum amount of displacement $\Delta_{max}$") when the brightness of the image is largest.

$R_1\times\beta-R_{ob}$ represents the distance between the position of the image 20a of the outer edge of the transmission part and the outer edge of the pupil 9 of the objective lens until both edges coincide. Thus, as shown in FIG. 10, when $R_1\times\beta-R_{ob}$ increases, the maximum amount of displacement $\Delta_{max}$ also increases.

When the maximum amount of displacement $\Delta_{max}$ increases, it is possible to detect a larger amount of displacement Δ. Here, the amount of displacement Δ and the amount of inclination of the surface of the sample are in a proportional relationship. Thus, when the maximum amount of displacement $\Delta_{max}$ increases, it is possible to detect a larger inclination. The amount of inclination can be represented by, for example, the angle formed between the normal to the surface and the optical axis.

Here, as described above, as $R_1\times\beta-R_{ob}$ increases, the maximum amount of displacement $\Delta_{max}$ increases. Thus, it is possible to detect a larger inclination as $R_1\times\beta-R_{ob}$ increases.

$R_1\times\beta-R_{ob}$ shows the size of the image of the transmission part formed outside the outer edge of the pupil 9 of the objective lens. Thus, as $R_1\times\beta-R_{ob}$ increases, the quantity of illumination light per unit area decreases. That is, as $R_1\times\beta-R_{ob}$ increases, the use efficiency of illumination light decreases.

As mentioned above, $R_{ob}-R_0\times\beta$ affects the brightness of the image, the detectable minimum amount of inclination, and the detection sensitivity for a change in inclination, and $R_1\times\beta-R_{ob}$ affects the detectable maximum amount of inclination and the use efficiency of illumination light. Thus, it is important to set an appropriate ratio for $R_{ob}-R_0\times\beta$ and $R_1\times\beta-R_{ob}$.

By satisfying the conditional expression (1), it is possible to efficiently illuminate the sample and, moreover, it is possible to observe the inclination at various angles of the sample at appropriate brightness and with good contrast.

When falling below a lower limit value of the conditional expression (1), the distance between the outer edge of the pupil 9 of the objective lens and the image 20b of the inner edge of the transmission part is too narrow. Hence, the image becomes dark when a sample is not present (including the case where the surface of the sample is flat).

Otherwise, the distance between the outer edge of the pupil 9 of the objective lens and the image 20a of the outer edge of the transmission part is too wide. Hence, the use efficiency of illumination light is reduced.

When exceeding an upper limit value of the conditional expression (1), the distance between the outer edge of the pupil 9 of the objective lens and the image 20b of the inner edge of the transmission part is too wide. In this case, the range in which the image of the light-shielding part moves becomes wide. Therefore, even when the inclination of the surface of the sample is large, it is difficult to detect a change in inclination (minute change in shape) of the surface of the sample, as a change in brightness. In this way, it is difficult to detect a small inclination because the detectable minimum amount of inclination is large.

Furthermore, since the detection sensitivity for a change in inclination becomes low, for example, it is likely that there is little difference in quantity of light passing through the pupil 9 of the objective lens between when a sample is not present and when a sample is present. As a result, the contrast of the sample image becomes worse.

Furthermore, in a sample having various inclinations on the surface, it is difficult to observe a change in inclination of the surface with good contrast.

When Ratio≤0, $R_{ob} \leq R_0 \times \beta$ is established. The state of $R_{ob} \leq R_0 \times \beta$ is a state in which the image of the light-shielding part 21 covers the pupil 9 of the objective lens. The observation in this case is in a dark-field observation.

Furthermore, when 1≤Ratio, $R_1 \times \beta - R_{ob} \leq R_{ob} - R_0 \times \beta$ is established. In this case, the image 20a of the outer edge of the transmission part is positioned on the inside of the pupil 9 of the objective lens before part of the image of light-shielding part 21 is positioned on the outside of the pupil 9 of the objective lens. Since there is no illumination light outside the image 20a of the outer edge of the transmission part, illumination light in the pupil 9 of the objective lens decreases. Therefore, when refraction of light rays occurs at the sample, the brightness of the image becomes dark. As a result, when a convex portion in the sample surface is observed, the image of that portion appears to be concave.

The observation of a sample includes observation by visual inspection and observation using an image pickup element. Furthermore, the image pickup element includes an image pickup element that performs electron multiplication and an image pickup element that does not perform electron multiplication.

An example of the image pickup element that performs electron multiplication is an electron multiplication-type CCD. In the electron multiplication-type CCD, a multiplication register that performs multiplication of a signal is provided in the output unit, and the charges detected by the photodetector unit are multiplied by the multiplication register. By doing so, the electron multiplication-type CCD is able to image a sample even when light from the sample is weak.

In the sample observation device that satisfies the conditional expression (1), it is preferable that an image pickup element that performs electron multiplication be used.

When observation by visual inspection is performed or when an image pickup element that does not perform electron multiplication is used, in the sample observation device of the present embodiment, it is preferable that the following conditional expression (1') be satisfied:

$$0.015 \leq \text{Ratio} \leq 0.9 \tag{1'}$$

where
Ratio=$(R_{ob}-R_0 \times \beta)/(R_1 \times \beta - R_{ob})$;

$R_0$ denotes the length from the optical axis of the illumination optical system to the inner edge of the transmission part;

$R_1$ denotes the length from the optical axis of the illumination optical system to the outer edge of the transmission part;

$R_{ob}$ denotes the radius of the pupil of the objective lens; and

β denotes the value obtained by dividing the focal length of the objective lens by the focal length of the condenser lens.

The technical meaning of the conditional expression (1°) is same as the technical meaning of the conditional expression (1).

The following conditional expression (1") may be satisfied instead of the conditional expression (1'):

$$0.03 \leq \text{Ratio} < 0.8 \tag{1"}$$

Furthermore, the following conditional expression (1''') may be satisfied instead of the conditional expression (1'):

$$0.05 \leq \text{Ratio} \leq 0.6 \tag{1'''}$$

In addition, it is more preferable that the following conditional expression (1'''') be satisfied instead of the conditional expression (1'):

$$0.1 \leq \text{Ratio} \leq 0.4 \tag{1-1''''}$$

As described above, $R_{ob}-R_0 \times \beta$ affects the brightness of the image, the detectable minimum amount of inclination, and the detection sensitivity for a change in inclination, and $R_1 \times \beta - R_{ob}$ affects the detectable maximum amount of inclination and the use efficiency of illumination light. It is then preferable that an appropriate range of Ratio be set depending on the magnitude of $R_1 \times \beta - R_{ob}$.

Figure 11:
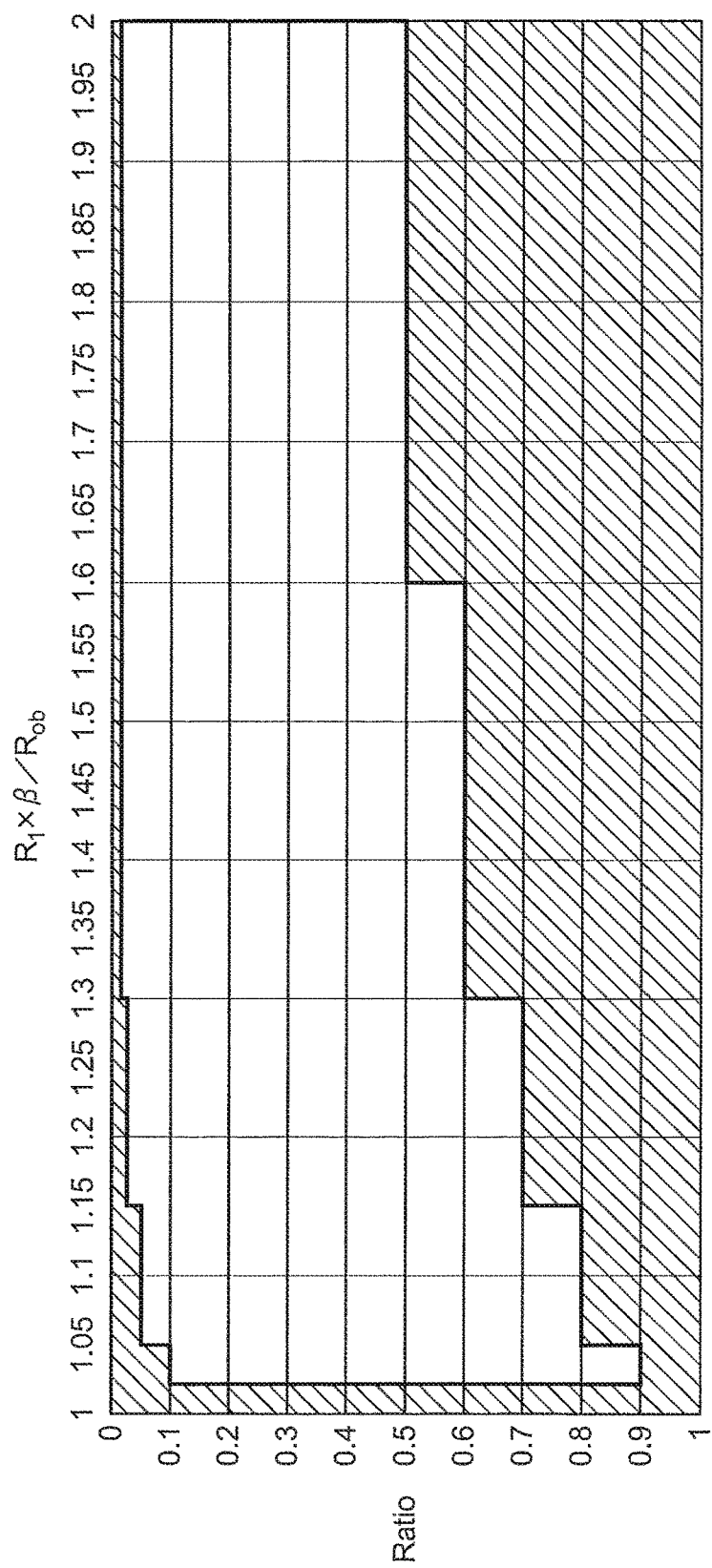
FIG. 11 is a diagram showing a preferable range for $R_1 \times \beta - R_{ob}$ and Ratio.

FIG. 11 is a diagram showing a preferable range for $R_1 \times \beta - R_{ob}$ and Ratio. In FIG. 11, the region excluding the hatched section shows the preferable range.

In the region of the hatched section on the upper left in FIG. 11, the value of $R_1 \times \beta/R_{ob}$ and the value of Ratio are small. That the value of $R_1 \times \beta/R_{ob}$ is small means that the value of $R_1 \times \beta - R_{ob}$ is small. Therefore, when the value of Ratio is also small, $R_{ob}-R_0 \times \beta$ decreases. The magnitude of $R_{ob}-R_0 \times \beta$ shows the brightness of the image when there is no inclination in the sample. Thus, in this region, the brightness of the image when there is no inclination in the sample is too dark.

Furthermore, in FIG. 11, in the region of the hatched section on the lower right, the value of $R_1 \times \beta/R_{ob}$ and the value of Ratio are large. That the value of $R_1 \times \beta/R_{ob}$ is large means that the value of $R_1 \times \beta - R_{ob}$ is large. Therefore, when the value of Ratio is also large, $R_{ob}-R_0 \times \beta$ increases. In this case, the brightness of the image when there is no inclination in the sample is sufficient, but the detectable minimum amount of inclination increases. Furthermore, the detection sensitivity for a change in inclination is reduced.

Based on this, in the sample observation device of the present embodiment, it is preferable that the following conditional expression (1-1) be satisfied when $1.02 \leq R_1 \times \beta/R_{ob} < 1.05$ is established:

$$0.1 \leq \text{Ratio} \leq 0.9 \tag{1-1}$$

Furthermore, in the sample observation device of the present embodiment, it is preferable that the following conditional expression (1-2) be satisfied when $1.05 \leq R_1 \times \beta/R_{ob} < 1.15$ is established:

$$0.05 \leq \text{Ratio} \leq 0.8 \tag{1-2}$$

Furthermore, in the sample observation device of the present embodiment, it is preferable that the following conditional expression (1-3) be satisfied when $1.15 \leq R_1 \times \beta/R_{ob} < 1.3$ is established:

$$0.025 \leq \text{Ratio} \leq 0.7 \tag{1-3}$$

Furthermore, in the sample observation device of the present embodiment, it is preferable that the following conditional expression (1-4) be satisfied when $1.3 \leq R_1 \times \beta / R_{ob} < 1.6$ is established:

$$0.015 \leq \text{Ratio} \leq 0.6 \qquad (1\text{-}4)$$

Furthermore, in the sample observation device of the present embodiment, it is preferable that the following conditional expression (1-5) be satisfied when $1.6 \leq R_1 \times \beta / R_{ob} < 2$ is established:

$$0.015 \leq \text{Ratio} \leq 0.5 \qquad (1\text{-}5)$$

In this way, in the sample observation device of the present embodiment, by selecting an appropriate Ratio depending on the magnitude of $R_1 \times \beta - R_{ob}$, it is possible to efficiently illuminate the sample and, moreover, it is possible to observe inclination at various angles in the sample at appropriate brightness and with good contrast.

Furthermore, the sample observation device of the present embodiment includes a light source, an optical system, and a holding member configured to hold an object, and the optical system includes a first optical system and a second optical system, and the first optical system and the second optical system face each other across the holding member, and the first optical system includes an aperture member, the optical system is configured so that the image of the transmission part of the aperture member is formed at the pupil position of the second optical system, and the following conditional expression (2) is satisfied:

$$1.1 \leq I_{0.1}/I_0 \qquad (2)$$

where $I_{0.1}$ denotes a quantity of light passing through the pupil of the second optical system when $\Delta d = 0.1 \times R_{ob}$;

$I_0$ denotes a quantity of light passing through the pupil of the second optical system when $\Delta d = 0$;

$\Delta d$ denotes an amount of displacement of the image of the transmission part of the aperture member relative to the pupil of the second optical system; and $R_{ob}$ denotes the radius of the pupil of the second optical system.

By satisfying the conditional expression (2), it is possible to efficiently illuminate the sample and, moreover, it is possible to observe inclination at various angles in the sample at appropriate brightness and with good contrast.

It is preferable that the following conditional expression (2') be satisfied instead of the conditional expression (2):

$$1.3 \leq I_{0.1}/I_0 \qquad (2')$$

Furthermore, it is preferable that the following conditional expression (2'') be satisfied instead of the conditional expression (2):

$$1.5 \leq I_{0.1}/I_0 \qquad (2'')$$

Furthermore, the sample observation method of the present invention is a method of observing a sample comprising emitting, to the sample, light flux with a predetermined width intersecting the optical axis of the objective lens, and the light flux with the predetermined width reaching the pupil position of the objective lens satisfies the following conditions (A), (B), and (C) when the sample is absent.

(A) The innermost light of the light flux with the predetermined width is positioned on the inside of the pupil of the objective lens.

(B) The outermost light of the light flux with the predetermined width is positioned on the outside of the pupil of the objective lens.

(C) The width of light flux positioned on the inside of the pupil of the objective lens is not less than 0.005 times and not more than 0.9 times the width of light flux positioned on the outside of the pupil of the objective lens.

By doing so, it is possible to efficiently illuminate the sample and, moreover, it is possible to observe inclination at various angles in the sample at appropriate brightness and with good contrast.

Modifications of the aperture member will be described. As described above, when the transmittance is same in every location in the transmission part, there occurs a state in which even when the amount of displacement Δ changes, the quantity of light flux I does not change (the range from the arrow A to the arrow B in FIG. 7A). It is then preferable to vary the transmittance in the transmission part depending on locations.

With this configuration, it is possible to decrease the state where the amount I of a light flux does not change with a change in the displacement amount Δ. As a result, it is possible to detect a finer change in shape at the sample (change in inclination) as a change in brightness.

Figure 12A:
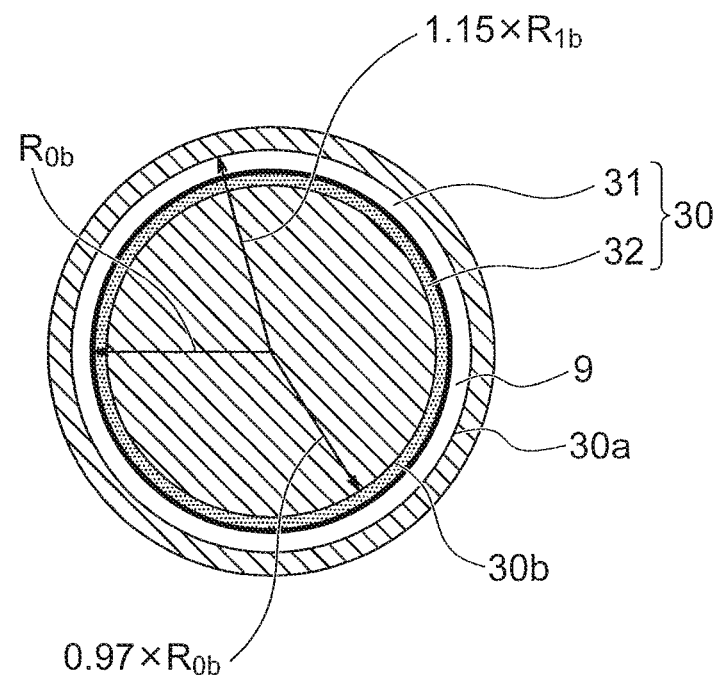
FIG. 12A and FIG. 12B are diagrams showing the relationship between the pupil of the objective lens and the image of the aperture member, where
Figure 12B:
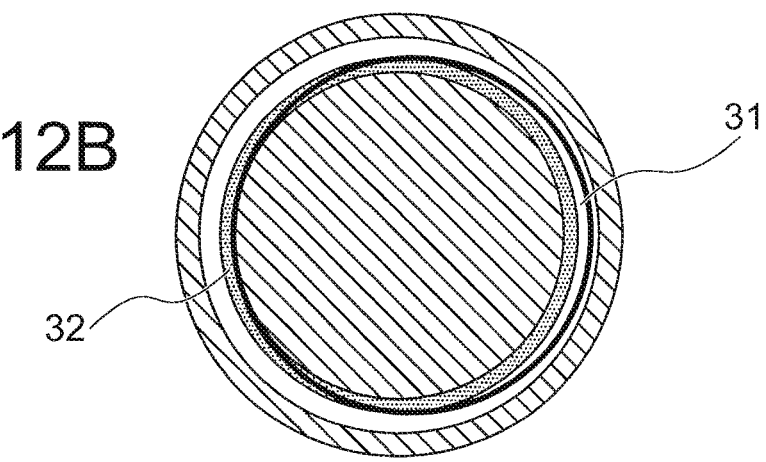

FIG. 12A and FIG. 12B are diagrams showing the relationship between the pupil of the objective lens and the image of the aperture member, where FIG. 12A shows the case where no sample is present, and FIG. 12B shows the case where a sample is present.

In the case where no sample is present, as shown in FIG. 12A, a shape of an image 30 of the transmission part is an annulus, and a shape of the pupil 9 of the objective lens is a circle. Then, the image 30 of the transmission part and the pupil 9 of the objective lens are concentric. Moreover, the center of the image 30 of the transmission part and the center of the pupil 9 of the objective lens coincide with each other.

The image 30 of the transmission part includes a region 31 and a region 32. The region 31 is a region from the outer edge of the pupil 9 of the objective lens to an image 30a of the outer edge of the transmission part. The region 32 is a region from an image 30b of the inner edge of the transmission part to the outer edge of the pupil 9 of the objective lens. Then, the transmittance at the transmission part of the aperture member 5 defining the region 31 is higher than the transmittance of the transmission part of the aperture member 5 defining the region 32.

In the case where no sample is present, the region 32 only is located inside of the outer edge of the pupil 9 of the objective lens. Therefore, the area of this region as a whole corresponds to the brightness of the sample image.

On the other hand, in the case where a sample is present, as shown in FIG. 12B, the image 30 of the transmission part and the pupil 9 of the objective lens are not concentric. Moreover, the center of the image 30 at the transmission part and the center of the pupil 9 of the objective lens do not coincide with each other. That is, the center of the image 30 of the transmission part is shifted to the left on the sheet with reference to the center of the pupil 9 of the objective lens.

In this case, a part of the region 32 is located outside of the outer edge of the pupil 9 of the objective lens. On the other hand, a part of the region 31 is located inside of the outer edge of the pupil 9 of the objective lens. As a result, the region 31 and the region 32 are located inside of the outer edge of the pupil 9 of the objective lens. Therefore, the area of this region as a whole corresponds to the brightness of the sample image.

As stated above, in the case where no sample is present, the region 32 only is located inside of the outer edge of the pupil 9 of the objective lens. On the other hand, in the case where a sample is present, the region 31 and the region 32 are located inside of the outer edge of the pupil 9 of the objective lens. Therefore, the brightness of a sample image differs between the case where no sample is present and the case where a sample is present.

In the case where a sample is present, the ratio occupied by the region 31 increases inside of the outer edge of the pupil 9 of the objective lens, and the ratio occupied by the region 32 decreases. Therefore, the brightness of a sample image is brighter in the case where a sample is present than in the case where no sample is present.

Moreover, in both of the cases where no sample is present and a sample is present, an image of the light-shielding part is located inside of the outer edge of the pupil 9 of the objective lens. Nevertheless, as stated above, the brightness of a sample image differs between the case where no sample is present and the case where a sample is present.

The result of calculating the area S while changing the displacement amount $\Delta$ is shown in FIG. 13A. In FIG. 13A, FIG. 13B, FIG. 13C and FIG. 13D. FIG. 13A is a graph showing the relationship between the displacement amount of an image of the aperture member with reference to the pupil of the objective lens, and the amount of a light flux passing through the pupil of the objective lens, and FIG. 13B, FIG. 13C and FIG. 13D are diagrams showing the displacement of an image of the aperture member with reference to the pupil of the objective lens. Here, FIG. 13B shows the case where no displacement occurs, FIG. 13C shows the case where small displacement occurs, and FIG. 13D shows the case where large displacement occurs.

In FIG. 13A, calculations are made with $R_0 \times \beta = 0.97 \times R_{ob}$ and $R_1 \times \beta = 1.15 \times R_{ob}$. In this case, since $R_{ob} - R_0 \times \beta = 0.03$ and $R_1 \times \beta - R_{ob} = 0.15$, Ratio=0.2.

Furthermore, the transmission part is divided into two regions. The transmittance of the inside region (the region 32 where the transmittance is low as shown in FIG. 12A) is 50%, and the transmittance on the outside region (the region 31 where the transmittance is high as shown in FIG. 12A) is 100%. Furthermore, in FIG. 13A, the numerical values on the horizontal axis and the vertical axis are standardized.

Moreover, in FIG. 13B, FIG. 13C, and FIG. 13D also, drawings showing the relationship between the pupil of the objective lens and the image of the aperture member is shown in A (FIG. 13B), B (FIG. 13C) and C (FIG. 139D). Since these drawings correspond to the drawings (A, B and C) showing the relationship between the pupil of the objective lens and the image of the aperture member in FIG. 7B, FIG. 7C and FIG. 7D, their detailed descriptions are omitted.

As is found from a comparison between FIG. 7A and FIG. 13A, at the aperture member whose transmittance varies from place to place at the transmission part, the amount I of a light flux changes with a change in the displacement amount $\Delta$ between arrow A and arrow B as well. Therefore, according to the observation device of the present embodiment, it is possible to detect a fine change in shape at the sample (change in inclination) as a change in brightness.

In the case where no sample is present, the transmittance of the transmission part located inside of the pupil 9 of the objective lens (the region 32 having low transmittance in FIG. 12A) is 50% in FIG. 13B, FIG. 13C and FIG. 13D, and 100% in FIG. 7B, FIG. 7C and FIG. 7D. As just described, the transmittance with no displacement is smaller in FIG. 13B than in FIG. 7B. Therefore, the brightness of the sample image becomes darker in FIG. 13B than in FIG. 7B.

In the sample observation device of the present embodiment, it is preferable that the sample observation device includes another aperture member that is different from the aperture member, and includes a moving mechanism to move the aperture member and the other aperture member.

With this configuration, it is possible to change the size or the position of an image of the transmission part. That is, by replacing the aperture member with a different aperture member, it is possible to change the length $R_0$ from the optical axis to the inner edge of the transmission part and the length $R_1$ from the optical axis to the outer edge of the transmission part freely. Therefore, it is possible to create an illumination state which generates the best shadow in accordance with the sample.

Further, when a phase-contrast objective lens is used, the following advantageous effect can be obtained. Phase-contrast observation can be performed by using a ring slit for phase-contrast observation as the illumination aperture, and observation by the sample observation device of the present embodiment can be performed by using the aperture member shown in FIG. 2A and FIG. 2B. That is, the observation by the sample observation device of the present embodiment and the phase-contrast observation can be performed without changing the objective lens. For other methods such as differential interference observation and Hoffmann modulation contrast observation as well, an observation by these methods and the observation by the sample observation device of the present embodiment can be performed similarly without changing the objective lens.

In the sample observation device of the present embodiment, it is preferable that the observation optical system includes an aperture member, and the aperture member is disposed at a pupil position of the objective lens, or at a position that is conjugate to the pupil position of the objective lens.

With this configuration, it is possible to change the size of the pupil of the objective lens with reference to the image of the transmission part. Therefore, it is possible to generate shadow most effectively in accordance with the sample.

Moreover, if vignetting occurs, the size of a light flux differs between the light flux emitted from the center of the sample and reaching the center of the sample image (hereinafter, referred to as "axial light flux" as appropriate) and the light flux emitted from the periphery of the sample and reaching the periphery of the sample image (hereinafter, referred to as "off-axis light flux" as appropriate). Typically if vignetting occurs, a shape of the off-axis light flux becomes a substantially an ellipse while a shape of the axial light flux is a circle.

Therefore, in the off-axis light flux, a state where the image of the transmission part is formed inside of the outer edge of the pupil of the objective lens occurs. Then, the relationship between the displacement amount $\Delta$ and the amount I of light flux differs between the center and the periphery of the sample image.

Then, by disposing an aperture member at the observation optical system, it is possible to make the vignetting small. With this configuration, it is possible to make the shape of the off-axis light flux to be a circle. Therefore, in the off-axis light flux as well, an image of the inner edge of the transmission part is formed inside of the outer edge of the pupil of the objective lens, and an image of the outer edge of the transmission part is formed outside of the outer edge of the pupil of the objective lens. As a result, the relationship between the displacement amount $\Delta$ and the amount I of light flux is the same between the periphery of the sample image and the center thereof. Therefore, a sample image free from unevenness of brightness can be obtained from the center to the periphery.

A similar effect will be obtained by using an objective lens having small vignetting. For an objective lens having small vignetting, a lens having a larger outer diameter is used than for an objective lens having large vignetting. In this case, a difference in diameter between the off-axis light flux and the axial light flux decreases. As a result, a sample image free from unevenness of brightness can be obtained from the center to the periphery. From this, it is preferable to use an objective lens having small vignetting.

FIG. 14 is a diagram showing the configuration of another sample observation device of the present embodiment. The same reference numerals are assigned to the same configurations as those in FIG. 1, and their detailed descriptions are omitted.

A sample observation device 110 includes an aperture member 5 and an aperture member 54. The aperture member 5 and the aperture member 54 are held at a moving mechanism 55. A slider or a turret is available as the moving mechanism 55, for example. When the moving mechanism 55 is a slider, the aperture member 5 and the aperture member 54 move in the direction orthogonal to the optical axis of the observation optical system. When the moving mechanism 55 is a turret, the aperture member 5 and the aperture member 54 rotate around an axis parallel to the optical axis of the observation optical system.

Although FIG. 14 illustrates one objective lens, the sample observation device 110 may hold a plurality of objective lenses at the same time. For example, when the objective lens 8 is a first objective lens, the sample observation device 110 can hold a second objective lens and a third objective lens. The three objective lenses may have optical performance, for example, magnification and NA, different from each other.

Moreover, the aperture member 5 and the aperture member 54 are different apertures. Then, a transmission part of the aperture member 5 is preferably configured so that an image of an inner edge of the transmission part is formed inside of an outer edge of a pupil of a first objective lens, and an image of an outer edge of the transmission part of the aperture member 5 is formed outside of the outer edge of the pupil of the first objective lens. The aperture member 5 and the aperture member 54 are different, it means that the position or the size of the transmission part differs between the aperture member 5 and the aperture member 54.

Moreover, the aperture member 54 may have a transmission part corresponding to a second objective lens having different magnification from that of the first objective lens which corresponds to the first aperture member. That is, the transmission part of the aperture member 54 is preferably configured so that an image of an inner edge of the transmission part is formed inside of an outer edge of a pupil of the second objective lens, and an image of an outer edge of the transmission part of the aperture member 54 is formed outside of the outer edge of the pupil of the second objective lens.

Moreover, when bright-field observation is performed by the aperture member 54, the aperture member 54 may be configured to include the transmission part at a center. Moreover, when phase-contrast observation is performed using the first objective lens by the aperture member 54, the aperture member 54 may be configured to include the transmission part whose diameter is smaller than the diameter of the transmission part of the aperture member 54.

Moreover, it is preferable that the sample observation device of the present embodiment may further include another aperture member which is different form the aperture member 5 and aperture member 54, and the aperture member 54 may include a transmission part for phase-contrast observation, and another aperture member may include a transmission part for bright-field observation.

As just described, according to the sample observation device of the present embodiment, it is possible to irradiate the objective lens with light in accordance with various observation methods. Thereby, when observation is performed using the aperture member 5 or the aperture member 54, and the sample includes an interested region, it is possible to perform phase-contrast observation or bright-field observation for the interested region by changing the aperture member.

The aperture member may include a transmission region variable part that can change the transmission region of the transmission part. The transmission region variable part may be configured by a liquid-crystal shutter, for example. With this configuration, it is possible to implement the aperture member 5 and the aperture member 54 with one aperture member. In this case, the moving mechanism is not required.

Moreover, in the sample observation device 110, an aperture member 56 is disposed at the position of the pupil 9 of the objective lens. In FIG. 14, for ease in viewing, the position of the pupil 9 of the objective lens and the position of the aperture member 56 are depicted so that they are apart from each other.

Moreover, in the sample observation device 110, a wavelength selection device 57 may be disposed removably in the optical path of the illumination optical system, e.g., between the light source 1 and the lens 2. When the light source 1 is white light, light having a wide wavelength range is emitted from the light source 1. Then, by inserting the wavelength selection element 57 into the optical path, it is possible to select light having a narrower wavelength range than white light as the illumination light. The light source 1 may be a monochromatic light source 1'.

Moreover, the sample observation device 110 may include an image-pickup element 58 and an image processing device 59. The image-pickup element 58 may be a CCD or a CMOS, for example. The image-pickup element 58 is disposed at an image position 11. A sample image picked up by the image-pickup element 58 is sent to the image processing device 59. In the image processing device 59, it is configured to be able to perform processing, such as contrast enhancement, noise removal or color conversion.

By the way, the microscope objective lens is a telecentric optical system. Therefore, the condenser lens also is a telecentric optical system. Accordingly, the pupil position of the condenser lens is a front focal position of the condenser lens. Here, as stated above, in the sample observation device of the present embodiment, the aperture member is disposed at the focal position (front focal position) of the condenser lens 4. With this configuration, a center part of the illumination light is shielded at the pupil position of the condenser lens. However, there is no need to set the position of shielding a center part of the illumination light exactly at the pupil position of the condenser lens, and the position may be in the vicinity of the pupil position of the condenser lens.

Here, as displacement (displacement in the optical axis direction) between the aperture member and the pupil position of the condenser lens increases, an image of the transmission part also is displaced from the pupil of the objective lens. For instance, when the aperture member coincides with the pupil position of the condenser lens, a light beam (hereinafter, referred to as "beam $L_{in}$" as appropriate) passing through the innermost part of the transmission part reaches the inside of the pupil of the objective lens. However, as the aperture member is displaced from the pupil position of the condenser lens, the beam $L_{in}$ heads for from the inside to the outside of the pupil of the objective lens. That is, an image of the transmission part is displaced from the pupil of the objective lens.

Moreover, when the objective lens is changed, the observation area changes. When the observation area changes, the angle of the beam $L_{in}$ with reference to the optical axis also changes. When this angle changes, the position of the beam $L_{in}$ reaching the pupil of the objective lens changes. That is, an image of the transmission part is displaced from the pupil of the objective lens. As a result, generation of shadow will change.

Then, the allowable range of displacement between the aperture member and the pupil position of the condenser lens is set while considering a change in the observation area. In the sample observation device of the present embodiment, the range (allowable range) in the vicinity of the pupil position is desirably within 20% of the focal length of the condenser lens. As long as within this range, it is possible to decrease a difference in the generated direction of shadow and the amount of generation between the center and the periphery of the sample. The range in the vicinity of the pupil position is more preferably within 10% of the focal length of the condenser lens.

As stated above, in the sample observation device using the aperture member 5 shown in FIG. 2A and the aperture member 5' shown in FIG. 2B, it is possible to obtain a sample image with shadow even when the sample is colorless and transparent. However, there is a case where a colorless and transparent sample and a stained sample have to be observed at one time (in the same viewing field), for example.

In such a case, illumination light will attenuate at the stained sample due to the color or the shade corresponding to the staining. Therefore, in the sample observation device using the aperture member 5 and the aperture member 5', a sample image of the stained sample will be dark, and so the stained sample may not be observed clearly. Accordingly, it is preferable to enable observation of both of a colorless and transparent sample and a stained sample favorably.

From this, in the sample observation device of the present embodiment, the aperture member includes a darkening part and a transmission part.

Figure 15:
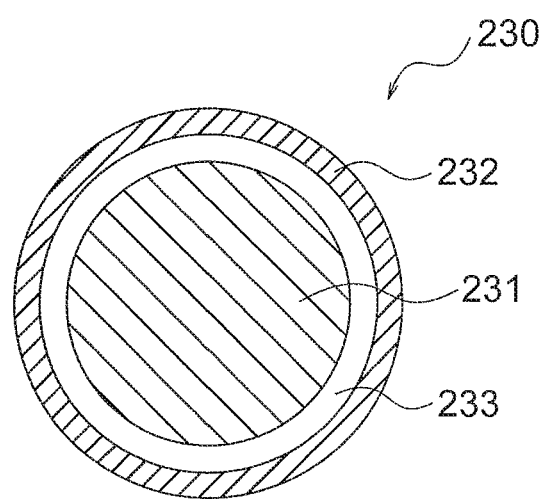
FIG. 15 is a diagram showing the configuration of the aperture member, and is a diagram showing an aperture member including a darkening part disposed at a transparent member.

FIG. 15 is a diagram showing the configuration of aperture members, and is a diagram showing an aperture member including a darkening part disposed at a transparent member.

As shown in FIG. 15, an aperture member 230 includes a darkening part 231, a light-shielding part 232 and a transmission part 233. The light-shielding part 232 is not necessarily required. At the aperture member 230, the darkening part 231 is disposed so as to include the optical axis of the illumination optical system. The transmission part 233 is located outside of the outer edge of the darkening part 231.

The darkening part 231, the light-shielding part 232 and the transmission part 233 are made of a transparent member, such as a glass plate or a resin plate. At the darkening part 231, a darkening film (thin film) is formed on a glass plate, for example. Moreover, the light-shielding part 232 is formed by applying light-shielding paint on a glass plate, for example. On the other hand, nothing is applied for the transmission part 233. Therefore, the transmission part 233 is a glass plate as it is. Although the darkening part 231 and the transmission part 233 come into contact with each other at the aperture member 230, a light-shielding part may be provided between them.

Illumination light incident on the aperture member 230 is not darkened at the transmission part 233, but is darkened at the darkening part 231. From the aperture member 230, annular illumination light and circular illumination light are emitted. Here, the circular illumination light is darker than the annular illumination light. When the aperture member 230 is used, a colorless and transparent sample is irradiated with annular illumination light and circular illumination light as well as a stained sample. The circular illumination light is the same as the illumination light for bright-field observation.

At a colorless and transparent sample, a sample image with shadow (hereinafter, referred to as shadow image as appropriate) is formed by the annular illumination light. On the other hand, a shadow image is not formed by the circular illumination light, and so light with constant brightness reaches the image position. As a result, a sample image becomes an image that the light with constant brightness and the shadow image are overlapped. However, the circular illumination light is darker than the annular illumination light. Therefore, the contrast of the shadow image is not degraded very much even when the light with constant brightness is overlapped with the shadow image. Thus, it is possible to obtain a sample image with shadow for a colorless and transparent sample.

Meanwhile, at a stained sample, a shadow image is formed by the annular illumination light. At this time, not only shadow is generated but also color or shade corresponding to the staining is added to the shadow image. On the other hand, a shadow image is not formed by the circular illumination light, and a sample image with color or shade corresponding to the staining (hereinafter referred to as shading image as appropriate) is formed. As a result, a sample image is an image that the shadow image and the shading image are overlapped. However, the annular illumination light attenuates due to the color or shade corresponding to the staining. Therefore, the contrast of the shading image is not degraded very much even when the shadow image is overlapped with the shading image. Thus, it is possible to obtain a sample image with the color or shade corresponding to staining for a stained sample.

As described above, by using the aperture member 230, it is possible to observe both of a colorless and transparent sample and a stained sample favorably.

Figure 16:
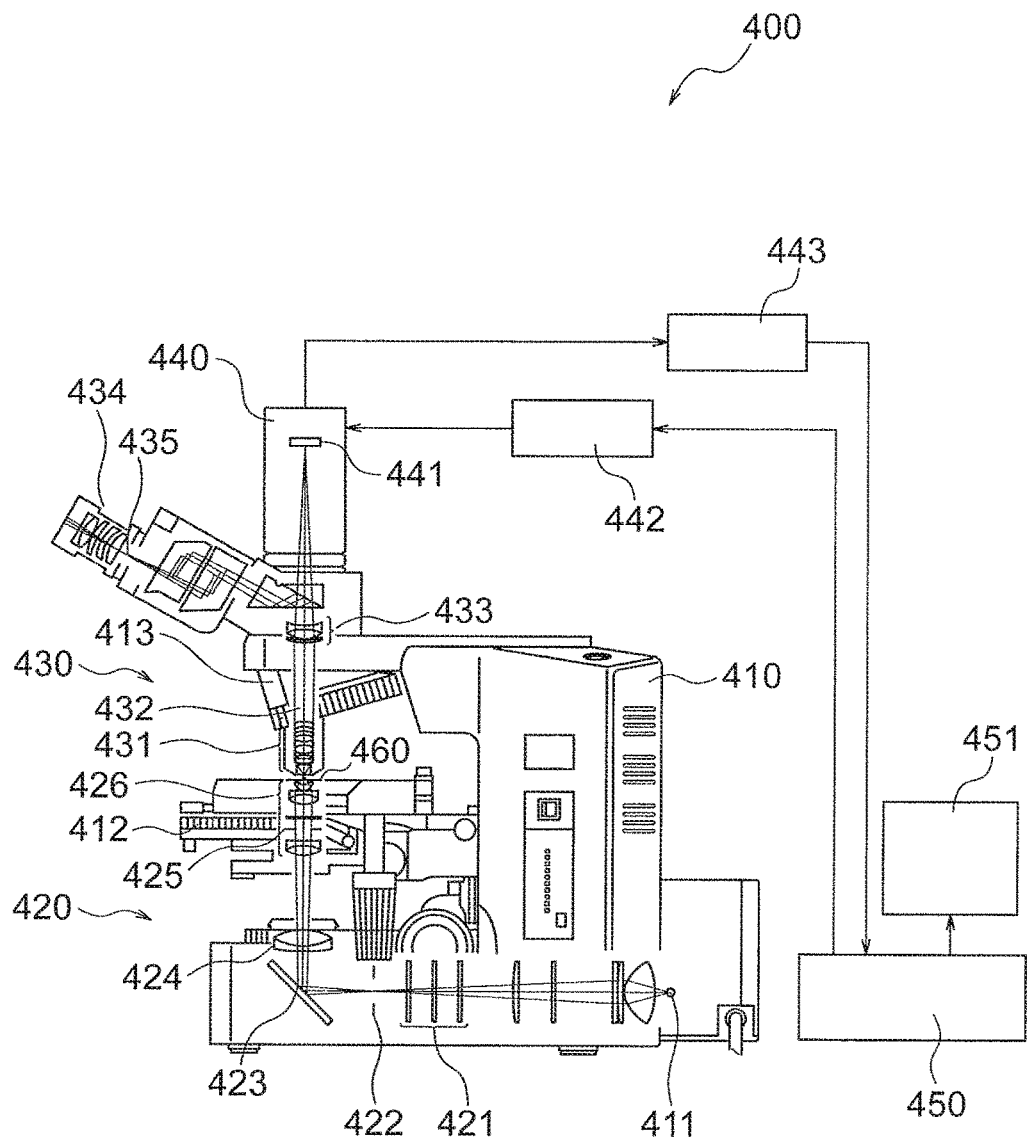
FIG. 16 is a diagram showing the configuration of a sample observation device including an image processing device.

As stated above, the sample observation device of the present embodiment preferably includes an image processing device. FIG. 16 is a diagram showing the configuration of a sample observation device including an image processing device.

A sample observation device 400 includes a main body part 410, an illumination optical system 420, an observation optical system 430, an image pickup device 440, and an image processing device 450.

The main body part 410 includes a light source 411, a stage 412 and a revolver 413. The illumination optical system 420 includes various types of optical filters 421, a field stop 422, a mirror 423, a lens 424, an aperture member 425, and a condenser lens 426. The observation optical system 430 includes an objective lens 431, an imaging lens 433, and an eyepiece 434. In the vicinity of the objective lens 431, a pupil 432 of the objective lens is located.

To the main body part 410, the light source 411 is connected. Illumination light emitted from the light source 411 enters the illumination optical system 420, and reaches the condenser lens 426. Here, the aperture member 425 is disposed at the pupil position of the condenser lens 426. Moreover, as the aperture member 425, the aperture member 5 shown in FIG. 2A is used.

Above the condenser lens 426, the stage 412 is disposed. Moreover, a sample 460 is placed on the stage 412. Further, above the stage 412, the revolver 413 is located, and the objective lens 431 is held at the revolver 413.

The sample 460 is irradiated with illuminating light emitted from the condenser lens 426. Light from the sample 460 enters the objective lens 431. Here, the pupil 432 of the objective lens is conjugate to the aperture member 425. Therefore, the image of the aperture member 425 is formed at the position of the pupil 432 of the objective lens.

Here, in the sample observation device 400, an image of the inner edge of the transmission part of the aperture member 425 is formed inside of the outer edge of the pupil of the objective lens 431, and an image of the outer edge of the transmission part of the aperture member 425 is formed outside of the outer edge of the pupil of the objective lens 431.

Therefore, the amount of imaging light emitted from the objective lens 431 changes with a change in shape at the sample 460 (change in inclination). Thereby, it is possible to detect a change in shape at the sample as a change in brightness. As a result, it is possible to obtain a sample image with shadow, even when the sample is colorless and transparent.

The imaging light emitted from the objective lens 431 is collected by the imaging lens 433, and an image of the sample 460 is formed at the light-collecting position. In the sample observation device 400, a prism is disposed, following the imaging lens 433. A part of the imaging light is reflected to the side of the eyepiece 434 by this prism. As a result, an optical image 435 of the sample is formed in the vicinity of the eyepiece 434. When observation using the eyepiece 434 is not performed, the prism may be moved to the outside of the optical path.

Meanwhile, the imaging light that passed through the prism enters the image pickup device 440. The image pickup device 440 includes an image-pickup element 441. An optical image of the sample 460 is formed on the image-pickup element 441 by imaging lens 433, whereby the optical image of the sample 460 is picked up. In this way, a sample image with shadow can be obtained. The optical system may be disposed between the imaging lens 433 and the image-pickup element 441. In this case, an optical image of the sample 460 is formed on the image-pickup element 441 by the imaging lens 433 and this optical system.

Moreover, to the image pickup device 440, a camera controller 442 and a video board 443 are connected. Moreover, the camera controller 442 and the video board 443 are both connected to the image processing device 450.

Control of image pickup is performed by the camera controller 442. Moreover, control of the camera controller 442 is performed by the image processing device 450. The control of the camera controller 442 may be performed by other devices, such as a computer. Moreover, an image signal output from the image pickup device 440 is input to the image processing device 450 via the video board 443. In the image processing device 450, various electrical processing is performed. The result of the processing is displayed on the display device 451.

By including the image processing device, it is possible to perform various image processing. Examples of the image processing are described below.

The present invention can include various modification examples without departing from the scope of the invention. For instance, the sample observation device of the present invention is described using an upright microscope in FIG. 1, FIG. 14 and FIG. 16. However, the sample observation device of the present invention may be an inverted microscope. That is, the present invention is applicable to an inverted microscope as well.

The present invention can provide a sample observation device and a sample observation method, in which the generated direction of shadow is not limited. Further the present invention can provide a sample observation device and a sample observation method, in which the positioning of an aperture member is simple.

As described above, the present invention is suitable for a sample observation device and a sample observation method, in which the generated direction of shadow is not limited. Further the present invention is suitable for a sample observation device and a sample observation method, in which the positioning of an aperture member is simple.

What is claimed is:

1. An observation device for observing a sample, the observation device comprising:
an illumination optical system; and
an observation optical system,
wherein:
the illumination optical system includes a light source, a condenser lens, and an aperture member,
the observation optical system includes an objective lens and an imaging lens,
the aperture member has a light-shielding part or a darkening part, and a transmission part,
the aperture member is disposed so that the light-shielding part or the darkening part includes an optical axis of the illumination optical system,
the transmission part is located outside of an outer edge of the light-shielding part or the darkening part,
an image of the transmission part of the aperture member is formed approximately at a pupil position of the objective lens,
an image of an inner edge of the transmission part is formed inside of an outer edge of a pupil of the objective lens,
an image of an outer edge of the transmission part is formed outside of the outer edge of the pupil of the objective lens,
when the sample is present, the image of the transmission part is decentered relative to the pupil of the objective lens due to refraction caused by the sample, and
the following conditional expressions are satisfied:

$$0.005 \leq \text{Ratio} \leq 0.9, \text{ and}$$

$$1.1 \leq I_{0.1}/I_0$$

where:
Ratio=$(R_{ob}-R_0\times\beta)/(R_1\times\beta-R_{ob})$;
$R_0$ denotes a length from the optical axis of the illumination optical system to the inner edge of the transmission part;
$R_1$ denotes a length from the optical axis of the illumination optical system to the outer edge of the transmission part;
$R_{ob}$ denotes a radius of the pupil of the objective lens;
$\beta$ denotes a value obtained by dividing a focal length of the objective lens by a focal length of the condenser lens;
$I_{0.1}$ denotes a quantity of light passing through the pupil of the objective lens when $\Delta d=0.1\times R_{ob}$;
$I_0$ denotes a quantity of light passing through the pupil of the objective lens when $\Delta d=0$; and Δd denotes an amount of displacement of the image of the transmission part of the aperture member relative to the pupil of the objective lens.

2. The sample observation device according to claim 1, wherein the following conditional expression is satisfied:

$$0.015 \leq \text{Ratio} \leq 0.9$$

where:
Ratio=$(R_{ob}-R_0 \times \beta)/(R_1 \times \beta - R_{ob})$;
$R_0$ denotes the length from the optical axis of the illumination optical system to the inner edge of the transmission part;
$R_1$ denotes the length from the optical axis of the illumination optical system to the outer edge of the transmission part;
$R_{ob}$ denotes the radius of the pupil of the objective lens; and
$\beta$ denotes the value obtained by dividing the focal length of the objective lens by the focal length of the condenser lens.

3. The sample observation device according to claim 2, wherein when $1.02 \leq R_1 \times \beta / R_{ob} < 1.05$, the following conditional expression is satisfied:

$$0.1 \leq \text{Ratio} \leq 0.9$$

where:
Ratio=$(R_{ob}-R_0 \times \beta)/(R_1 \times \beta - R_{ob})$;
$R_0$ denotes the length from the optical axis of the illumination optical system to the inner edge of the transmission part;
$R_1$ denotes the length from the optical axis of the illumination optical system to the outer edge of the transmission part;
$R_{ob}$ denotes the radius of the pupil of the objective lens; and
$\beta$ denotes the value obtained by dividing the focal length of the objective lens by the focal length of the condenser lens.

4. The sample observation device according to claim 2, wherein when $1.05 \leq R_1 \times \beta / R_{ob} < 1.15$, the following conditional expression is satisfied:

$$0.05 \leq \text{Ratio} \leq 0.8$$

where:
Ratio=$(R_{ob}-R_0 \times \beta)/(R_1 \times \beta - R_{ob})$;
$R_0$ denotes the length from the optical axis of the illumination optical system to the inner edge of the transmission part;
$R_1$ denotes the length from the optical axis of the illumination optical system to the outer edge of the transmission part;
$R_{ob}$ denotes the radius of the pupil of the objective lens; and
$\beta$ denotes the value obtained by dividing the focal length of the objective lens by the focal length of the condenser lens.

5. The sample observation device according to claim 2, wherein when $1.15 \leq R_1 \times \beta / R_{ob} < 1.3$, the following conditional expression is satisfied:

$$0.025 \leq \text{Ratio} \leq 0.7$$

where:
Ratio=$(R_{ob}-R_0 \times \beta)/(R_1 \times \beta - R_{ob})$;
$R_0$ denotes the length from the optical axis of the illumination optical system to the inner edge of the transmission part;
$R_1$ denotes the length from the optical axis of the illumination optical system to the outer edge of the transmission part;
$R_{ob}$ denotes the radius of the pupil of the objective lens; and
$\beta$ denotes the value obtained by dividing the focal length of the objective lens by the focal length of the condenser lens.

6. The sample observation device according to claim 2, wherein when $1.3 \leq R_1 \times \beta / R_{ob} < 1.6$, the following conditional expression is satisfied:

$$0.015 \leq \text{Ratio} \leq 0.6$$

where:
Ratio=$(R_{ob}-R_0 \times \beta)/(R_1 \times \beta - R_{ob})$;
$R_0$ denotes the length from the optical axis of the illumination optical system to the inner edge of the transmission part;
$R_1$ denotes the length from the optical axis of the illumination optical system to the outer edge of the transmission part;
$R_{ob}$ denotes the radius of the pupil of the objective lens; and
$\beta$ denotes the value obtained by dividing the focal length of the objective lens by the focal length of the condenser lens.

7. The sample observation device according to claim 2, wherein when $1.6 \leq R_1 \times \beta / R_{ob} < 2$, the following conditional expression is satisfied:

$$0.015 \leq \text{Ratio} \leq 0.5$$

where:
Ratio=$(R_{ob}-R_0 \times \beta)/(R_1 \times \beta - R_{ob})$;
$R_0$ denotes the length from the optical axis of the illumination optical system to the inner edge of the transmission part;
$R_1$ denotes the length from the optical axis of the illumination optical system to the outer edge of the transmission part;
$R_{ob}$ denotes the radius of the pupil of the objective lens; and
$\beta$ denotes the value obtained by dividing the focal length of the objective lens by the focal length of the condenser lens.

8. A method of observing a sample comprising:
emitting, to the sample, light flux with a predetermined width intersecting an optical axis of an objective lens, wherein:
the light flux with the predetermined width reaching a pupil position of the objective lens satisfies the following conditions (A), (B), and (C) when the sample is absent:
(A) innermost light of the light flux with the predetermined width is positioned on an inside of a pupil of the objective lens;
(B) outermost light of the light flux with the predetermined width is positioned on an outside of the pupil of the objective lens; and
(C) an image of a transmission part of an aperture member that limits the light flux is formed near the pupil of the objective lens, and a width of the light flux positioned on the inside of the pupil of the objective lens is not less than 0.005 times and not more than 0.9 times a width of the light flux positioned on the outside of the pupil of the objective lens;

when the sample is present, the image of the transmission part is decentered relative to the pupil of the objective lens due to refraction caused by the sample; and the following conditional expression is satisfied:

$$1.1 \leq I_{0.1}/I_0$$

where:
- $I_{0.1}$ is a quantity of light passing through the pupil of the objective lens when $\Delta d=0.1 \times R_{ob}$;
- $I_0$ is a quantity of light passing through the pupil of the objective lens when $\Delta d=0$;
- $\Delta d$ is an amount of displacement of the image of the transmission part of the aperture member relative to the pupil of the objective lens; and
- $R_{ob}$ is a radius of the pupil of the objective lens.

* * * * *